United States Patent [19]
Sasaki et al.

[11] Patent Number: 5,500,166
[45] Date of Patent: Mar. 19, 1996

[54] METHOD FOR CONTROLLING INJECTION VOLUME OF MATERIAL INTO MOLD

[75] Inventors: Yosuke Sasaki, Zama; Hideaki Okubo, Hiratsuka, both of Japan

[73] Assignee: Kabushiki Kaisha Komatsu Seisakusho, Tokyo, Japan

[21] Appl. No.: 306,683

[22] Filed: Sep. 15, 1994

Related U.S. Application Data

[62] Division of Ser. No. 10,562, Jan. 28, 1993, Pat. No. 5,370,518.

[30] Foreign Application Priority Data

| Jan. 29, 1992 | [JP] | Japan | 4-38526 |
| Feb. 7, 1992 | [JP] | Japan | 4-56981 |
| Feb. 26, 1992 | [JP] | Japan | 4-75532 |

[51] Int. Cl.$^6$ .................... B29C 45/08; B29C 45/64
[52] U.S. Cl. .................. 264/40.4; 264/40.5; 264/40.7; 264/328.7; 264/328.11
[58] Field of Search .................... 264/40.4, 40.5, 264/40.7, 328.7, 40.1, 328.11; 425/145, 149, 150, 147, 562, 567, 590, 592, 595, 451.2, 451.5

[56] References Cited

U.S. PATENT DOCUMENTS

| 4,932,854 | 6/1990 | Matsuda et al. | 425/146 |
| 5,221,509 | 6/1993 | Fujimoto et al. | 425/145 |
| 5,240,398 | 8/1993 | Akaguma et al. | 425/146 |
| 5,258,147 | 11/1993 | Yokota | 425/145 |
| 5,260,010 | 11/1993 | Yokota | 425/145 |
| 5,266,247 | 11/1993 | Yokota | 425/145 |

*Primary Examiner*—Mathieu D. Vargot
*Attorney, Agent, or Firm*—Richards, Medlock & Andrews

[57] ABSTRACT

In an injection and compression molding process wherein molten material is fed by a screw, incorporating a counterflow preventing valve (CPV), through a flow control valve (FCV) into a mold cavity, the injection volume is controlled by:

with the FCV closed, feeding a predetermined quantity of material through the CPV into a chamber between the CPV and the FCV, then advancing the screw with the FCV maintained closed to cause the CPV to close, thereby raising the pressure of the material in the chamber, determining when the pressure of the material in the chamber reaches a predetermined pressure, determining whether the movable die is at a predetermined distance from the stationary die, opening the FCV after the pressure of the material in the chamber has reached said predetermined pressure and the movable die is at the predetermined distance from the stationary die, setting as an original point of a determination of the injection volume either (a) a position of the screw at the opening of the FCV or (b) a time at the opening of the FCV, injecting the material into the mold cavity while the mold cavity is open to atmospheric pressure, closing the FCV either (a) when the screw has reached a position advanced a predetermined distance from the thus set original point or (b) at a predetermined time after the thus set original point, and compressing the material in the mold cavity.

25 Claims, 13 Drawing Sheets

METHOD FOR CONTROLLING INJECTION VOLUME OF MATERIAL INTO MOLD

RELATED APPLICATION

This is a division of our application Ser. No. 08/010,562, filed Jan. 28, 1993, and now U.S. Pat. No. 5,370,518.

FIELD OF THE INVENTION

The present invention relates to an injection and compression molding apparatus and an injection controlling method therefor. In a particular aspect, the invention relates to a horizontal injection and compression molding apparatus which initiates the supply of a molten plastic material when the dies are parted from each other with a predetermined space therebetween, an injection controlling method, and an injection volume controlling method.

BACKGROUND OF THE INVENTION

With the advance of large-sizing of injection molding machines, a powerful die fastening force is required for a die fastening device, while an increase in operational speed is required for satisfying the demand for enhancing the productivity. A need of reducing the installation space of the injection molding machine is also important since the machine has a large size. Accordingly, as the first background area, there has been increasing prosperous use of a method which utilizes a horizontal injection molding machine in which the opening and closing of the dies are effected by extending and retracting a small diameter, long cylinder assembly at a high speed but with a low drive force, and the dies are powerfully fastened by a large diameter, short cylinder assembly before the die fastening reaction engagement is locked in a die closing condition in which the dies are close together (for example, refer to Japanese Laid-Open Patent No. 1-232,005). Further, in the production of a large molded article, a molding method using a vertical press device has been proposed (refer to Japanese Patent Publication 3-6880 and Japanese Laid-Open Patent No. 2-172,711).

Next, as the second background area, a compression molding method in which pressing is carried out during or after injection, and an injection and compression molding method in which pressing is initiated after or just before completion of injection in order to eliminate distortion and to enhance the quality of the outer surface of a molded article, have been proposed, for example, as disclosed in Japanese Patent Laid-Open No. 62-268,620.

Further, as the third background area, an injection molding machine has injected molten resin at a high pressure, in a range of several hundred kilograms/square centimeter to several thousand kilograms/square centimeter, into a mold cavity defined by a movable die and a stationary die, from a heated cylinder by advancing a screw when the movable die and the stationary die are closed together, i.e., abutting against each other. Recently, the injection volume of molten resin has been changed in accordance with a charge volume within the mold cavity, and has been regulated by the advance speed of the screw. Further, an injection and compression molding method as disclosed in Japanese Laid-Open Patent No. 62-268,620 has been used in order to enhance the quality of a molded article.

Each of these background areas has problems which need to be solved. In the first background area as disclosed in the Japanese Laid-Open Patent No. 1-232,005, where a die fastening device is provided in the injection molding machine, the production of a large-size molded article requires an injection pressure of several thousand kilograms/square centimeter in order to feed molten resin into every nook and corner of the mold cavity, and accordingly, the die fastening device which has to receive a reaction force becomes very large.

In the first background area as disclosed in Japanese Patent Publication No. 3-6880 and Japanese Laid-Open Patent No. 2-172,711, problems similar to that with the system of Japanese Laid-Open Patent No. 1-232,005 are encountered. Further, a compression molding apparatus using a vertical press device which is operated at a low pressure during injection has been proposed. However, a large floor area is required for arranging the press device and the injection device, and the overall height of the apparatus becomes greater. Further, unlike a horizontal type, the vertical press device cannot use a crane or the like for replacing dies, so that a delivery device is complicated, and many manhours are required. Also, the delivery of a molded article cannot be made by using a conventional device, and the floor area and the operating space required for a robot become larger. Moreover, the delivery of a molded article requires the gripping of opposite ends of the article, and accordingly, a robot cannot be readily used therefor.

A problem in the second background area occurs with the molding of a large molded article, in that an injection pressure of several thousand kilograms/square centimeter is required in order to feed resin into every nook and corner of the mold cavity, since the die fastening device is used in the injection molding machine disclosed in the Japanese Laid-Open Patent No. 1-232,005. Accordingly, the size of the die fastening device which receives a reaction force becomes extremely large. Further, the control of the wall thickness of a molded article in the pressing direction in the compression molding method is difficult, with the result that the wall thickness is uneven. Also cold marks and flow marks are likely to occur so that the quality of the outer surface of a molded article is inferior. Further, the control of the speed of the flow front is difficult. Also, as the degree of opening of the dies in the injection and compression molding method is small, a pressure equal to that of injection molding is required, with the result that the die fastening device becomes extremely large. Further, joint molding and deep-shape molding cannot be readily made. Further, the control of speed of the flow front becomes concentric, similar to that of the injection molding.

In the molding method disclosed in Japanese Laid-Open Patent No. 62-268620, the compression stroke is too short to sufficiently feed resin, with the result that the molding of a complicated shape molded article or a large size molded article is very difficult. Further, since resin has to be injected in an amount which is in excess of the desired weight of the molded article, a pressure releasing part is required for the resin, with the result that the shape of dies is complicated.

As a problem of the third background area, the injection molding machine measures the position of a screw or a injection cylinder assembly in order to obtain an injection timing or a variable injection volume in accordance with a variation in the desired charge volume, but the desired injection volume for an article is not obtained because a hold pressure is applied, after completion of an injection process, to a molded article which is then supplemented with additional molten resin during the cooling of the molded article in order to prevent the occurrence of a shrinkage cavity or the like. Further, in the compression molding machine, the accuracy of the mass of molten resin corresponding to the mass of a desired molded article is generally inferior, and the control of the wall thickness of the molded article in the pressing direction is difficult such that the wall thickness becomes uneven.

On the other hand, in the process disclosed in Japanese Laid-Open Patent No. 62-268,620, a safety valve (pressure releasing part) is provided in the dies in order to discharge excess molten resin when the compression and drawing are made, as the mass of the molten resin injected into the mold cavity is in excess of the mass of the molded article to be produced, in order to reduce the unevenness of the wall thickness and to enhance the quality of the molded article. Accordingly, the dies are complicated, and after completion of the mold article, the pressure releasing part has to be removed, resulting in useless manhours and wasted resin.

SUMMARY OF THE INVENTION

The present invention is devised in view of the above mentioned problems. Accordingly, a first object of the present invention is to separate a movable die, mounted on a die plate, from a stationary die by a predetermined distance so as to inject a molten plastic material into a widened mold cavity which is open to atmospheric pressure, whereby it is possible to inject the molten plastic material at a low injection pressure. Further, since the molten plastic material flows under compression and drawing in the widened mold cavity so that the fluidity can be replenished, the molding can be made without deteriorating the physical properties of the plastic material while the pressure applied to the plastic material can be made to be uniform. Also, since the density can be made to be uniform, a molded article with less distortion and warping can be made. Thus, with the application of press molding during injection molding, the fluid length/wall thickness can be about three to four times as large as that of a conventional molding, whereby it is possible to perform a molding process to obtain a thin wall thickness.

Another object of the present invention is to facilitate the use of a delivery device, as has been used in conventional injection molding machines, and to facilitate the use of a robot, since a horizontal compression molding machine having a low height is used. Since the press device and the injection device permit space for the robot in the arrangement of the press device, the injection device and the delivery device, the operating area of the robot can be reduced such that the required floor area can be reduced. Also, since a crane or the like can be used for replacement of the dies, the manhours required for changeover of dies can be reduced.

In order to achieve the above mentioned objects, there is provided a combination of a compression molding device and an injection device, wherein the compression molding device comprises: a stationary die plate for holding a stationary die arranged vertically to a ground surface, a movable die plate for holding a movable die, means for rapidly extending and retracting the movable die plate in a generally horizontal direction relative to the stationary die plate, and a die fastening means for moving the movable die plate toward the stationary die plate so as to fasten the dies while a molten plastic material is compressed and drawn after the movable die plate has approached the stationary die plate to a predetermined position; and wherein the injection device comprises a device for opening a flow control valve so as to feed the molten plastic material to the compression molding device after the movable die plate has approached the stationary die plate to the predetermined position.

In another arrangement, there is further provided a delivery device for delivering a molded article from between the stationary die plate and the movable die plate.

In a particular arrangement of the injection and compression molding apparatus, the compression molding device comprises: a stationary die plate holding a stationary die, a movable die plate holding a movable die, means for rapidly extending and retracting the movable die plate in a generally horizontal direction relative to the stationary plate, means for locking the movable die plate to at least one tie bar at a position where the movable die plate has approached the stationary die plate to a predetermined position (i.e. the stationary die and the movable die are separated from each other by a predetermined distance), and means for fastening the dies after the movable die plate is locked to the at least one tie bar. In this particular arrangement, the injection device feeds a molten plastic material into a mold cavity formed by the stationary die and the movable die. A method of controlling injection molding in this particular arrangement comprises initiating the feeding of the molten plastic material into the mold cavity when the stationary die and the movable die are separated from each other by a predetermined distance, and compressing and drawing the plastic material in the mold cavity while extending the movable die in a generally horizontal direction towards the stationary die after a predetermined quantity of the molten plastic material has been fed to the mold cavity.

Another object of the invention is to perform press molding while the injection of the molten material is conducted, so as to mold an article having a thin wall from a plastic material having a low fluidity.

Another object of the invention is to eliminate a gap in the locking means, since the movement of the movable die plate is made by changing the extending and retracting means into the die fastening means during the die fastening operation. Accordingly, the shear edge clearance (clearance J shown in FIG. 5) between the movable die and the stationary die can be decreased, and damage and abrasion of the guide pins can be reduced while the gap between each guide pin and the associated guide pin hole can be decreased, whereby it is possible to enhance the quality of a molded article.

Another object of the invention is to eliminate the necessity of a pressure releasing device, so as to simplify the structure of the dies, by controlling the injection volume of the molten plastic material through the use of a flow control valve. Further, the flow control valve is actuated to its closed position, so as to stop the supply of the molten plastic material, when the mass of molten plastic material injected is equal to that of the article to be molded; and thereafter a pressure is applied to the molten plastic material in the mold cavity. Thus, no excessively high pressure has to be applied to the molten plastic material in the heating cylinder, and accordingly, it is possible to prevent the molten material from deteriorating.

An arrangement of a horizontal injection and compression molding apparatus for achieving these objects comprises: a stationary die plate for holding a stationary die, a movable die plate for holding a movable die, means for rapidly extending and retracting the movable die plate in a generally horizontal direction relative to the stationary plate, means for locking the movable die plate to at least one tie bar at a position where the movable die plate has approached the stationary die plate, means for fastening the dies after the movable die plate is locked to the tie bars, and an injection device for feeding molten plastic material into a mold cavity formed by the stationary die and the movable die; wherein the injection device comprises a distance sensor for detecting a distance between the movable die plate and the stationary die plate, a flow control valve adapted to be opened by a signal indicating that the movable plate has approached the stationary die plate to a predetermined position, and a control device for controlling the flow control valve in accordance with a signal from the distance sensor indicating that the movable plate has approached the stationary die plate to the predetermined position.

A method of controlling injection in an injection and compression apparatus, so as to inject the desired quantity of a molten plastic material into a mold cavity defined by a movable die and a stationary die and to compress and draw the plastic material in the mold cavity, comprises the steps of: causing the movable die to approach the stationary die, stopping the movable die when the movable die has approached the stationary die so that the movable die and the stationary die are separated from each other by a predetermined distance, initiating injection of the molten plastic material after or just before this stopping of the movable die plate, then moving the movable die toward the stationary die again after a predetermined quantity of the molten plastic material has been injected into the mold cavity, halting the injection of molten plastic material into the mold cavity when the amount of molten plastic material injected into the mold cavity is equal to the amount of plastic material in the article to be molded, and moving the movable die toward the stationary die even after the stopping of the injection of the molten plastic material into the mold cavity.

In another control method, a die opening and closing cylinder is changed into a die fastening cylinder for moving the movable die so as to change the speed of the movable die during the stopping (deceleration) of the movable die after the movable die has approached the stationary die so that the dies are separated from each other by the predetermined separation distance. Further, the volume of the molten plastic material to be injected can be changed during the time the movable die plate is stopped after the movable die has approached the stationary die to the predetermined separation distance. Moreover, at least one of the moving speed of the movable die and the injection volume of the molten plastic material can be changed during the movement of the movable die which occurs after the movable die has approached the stationary die to the predetermined separation distance. The flow control valve is actuated to its closed position, so as to stop the feeding of the molten plastic material, when the weight of the molten plastic material injected into the mold cavity is equal to the weight of the desired molded article, and thereafter, the movable die is further moved towards the stationary die so as to compress the plastic material contained in the mold cavity.

Another object of the invention is to provide a procedure to make it possible to rapidly raise the pressure of the molten resin in the heating cylinder to a predetermined pressure, wherein a feeding screw in the heating cylinder is advanced while a flow control valve at the front end of the heating cylinder is maintained closed so that a counterflow preventing ring abuts against the screw to prevent the molten resin in the heating cylinder from being discharged rearwardly. Further, since a first advanced position of the screw (or time) is set to an original point for the determination of the injection volume, and since the screw is advanced from that position to a second advanced position while the flow control valve is opened in order to inject the resin, the quantity of the molten resin injected can be precisely obtained by ascertaining the distance (or time) between the first advanced position and the second advanced position of the screw. Also, since the supply of the molten resin is stopped by closing the flow control valve after an amount of molten resin equal to the mass of a desired molded article is obtained in accordance with the second advanced position of the screw, it is possible to use such simple device to control the injection volume with a higher degree of accuracy. Further, since molded articles can be manufactured with less unevenness, maintenance requirements are substantially reduced.

In a method of controlling the injection volume of molten material in an injection molding apparatus in which the injection volume of molten resin fed into a mold cavity, defined between a stationary die and a movable die, through a flow control valve provided at the front end of a heating cylinder is determined by advancing a screw which incorporates a counterflow preventing ring, the screw is advanced while the flow control valve is maintained closed so as to cause the screw to abut against the counterflow preventing ring, then the pressure of the molten resin in the portion of the heating cylinder between the counterflow preventing ring and the flow control valve is raised to a predetermined pressure, so that a first advanced position of the screw is set to an original point of the injection volume at this time, and the injection volume of the molten resin is determined by further advancing the screw to a second advanced position of the screw.

In another method of controlling the injection volume of molten resin in an injection molding apparatus in which the injection volume of molten resin fed into a mold cavity, defined between a stationary die and a movable die, through a flow control valve provided at the front end of a heating cylinder is determined by advancing a screw which incorporates a counterflow preventing ring, the screw is advanced while the flow control valve is maintained closed so as to cause the screw to abut against the counterflow preventing ring, the time at which the pressure of the molten resin in the heating cylinder is raised to a predetermined pressure is set as an original point, and the screw is advanced during a predetermined period of time beginning from said original point so as to determine the injection volume.

BRIEF DESCRIPTION OF THE DRAWINGS

FIGS. 10A–10G are views illustrating one example of a compression process for different dies, according to the present invention, wherein FIG. 10A shows a fully opened condition after a molded article has been ejected;

FIG. 10B shows the movable die in a stopped condition in which a mold cavity having a space corresponding to a predetermined stroke is formed;

FIG. 10C shows the injection valve in its opened condition to initiate the injection of the molten plastic material into the mold cavity;

FIG. 10D shows the movable die at the time when a predetermined ratio of the quantity of molten plastic material actually injected to the total quantity to be injected has been achieved;

FIG. 10E shows the condition where the quantity of injected molten plastic material corresponds to the mass of plastic material in the desired molded article;

FIG. 10F shows a condition in which the injection and compression molding is completed;

FIG. 10G shows the movable die separated from the stationary die, exposing the molded article;

FIGS. 12A, 12B and 12C are views for explaining an injection volume control method, wherein FIG. 12A shows the position of the retracted screw;

FIG. 12B shows an intermediate position of the screw (original point) where the measurement of the injection quantity is initiated;

FIG. 12C shows the position of the screw at the completion of the injection of the molten plastic material into the mold cavity;

DESCRIPTION OF THE PREFERRED EMBODIMENTS

Figure 3:
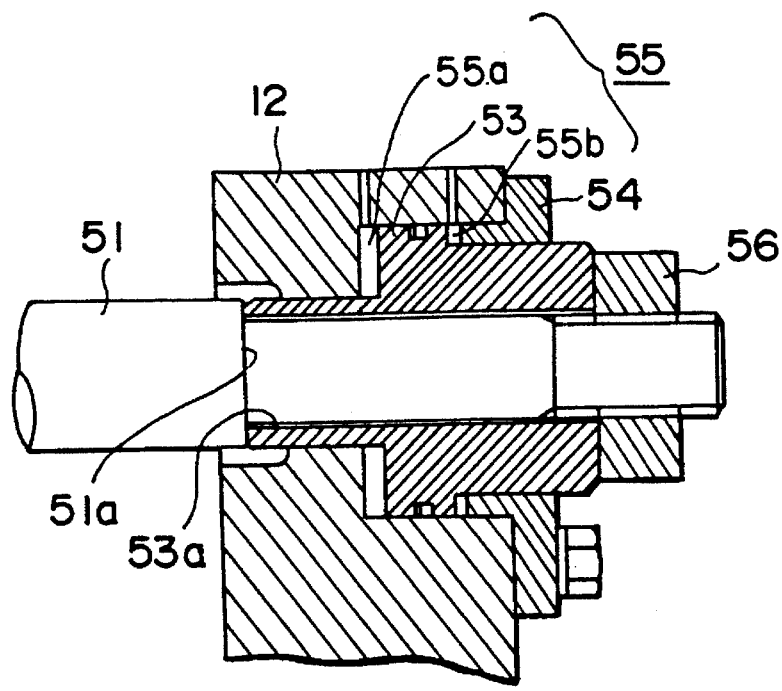
FIG. 3 is a partially enlarged view illustrating a die fastening device.
Figure 4:
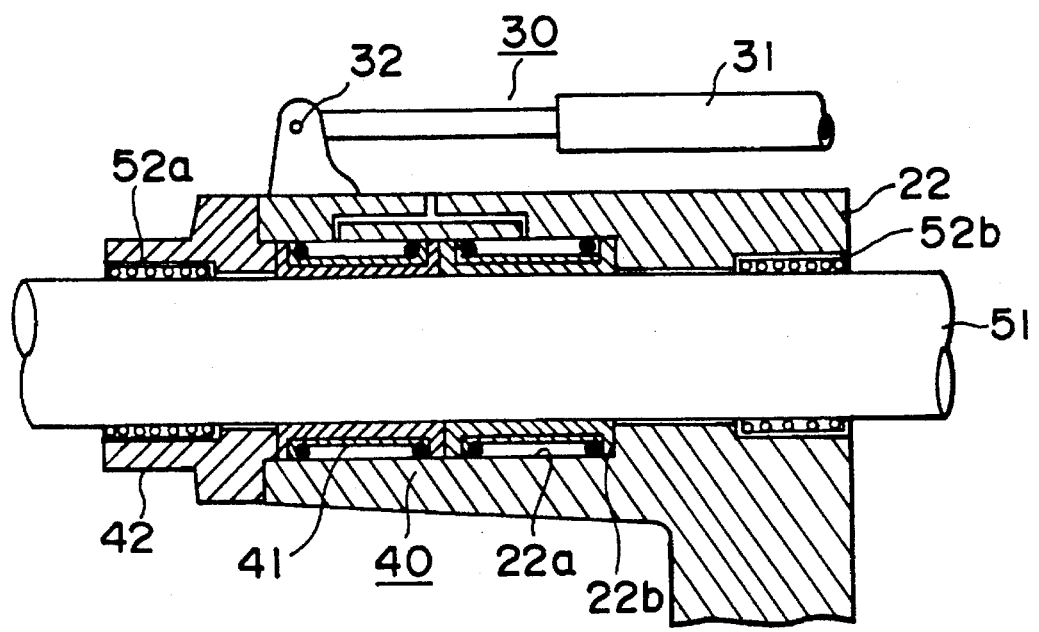
FIG. 4 is a partially enlarged view illustrating a locking device.
Figure 5:
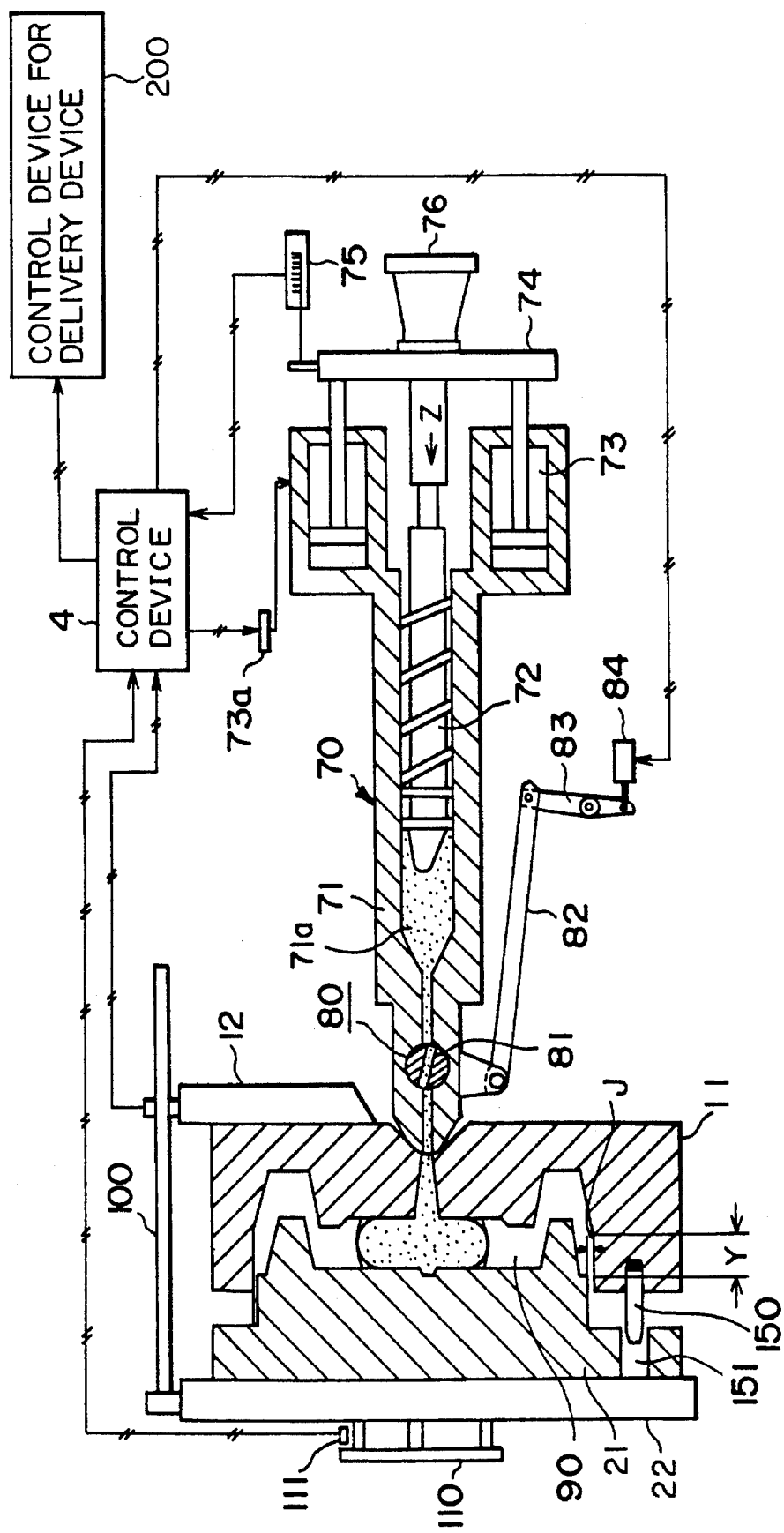
FIG. 5 is a schematic view illustrating a die section, an injection device, and a control device section.

Referring now to FIGS. 1 to 5, illustrating one embodiment of a horizontal injection and compression molding apparatus according to the present invention, the horizontal injection and compression molding apparatus i is composed of a compression molding device 2, an injection device 3 and a control device 4 (shown in FIG. 5). Further, a delivery device 5 (shown in FIG. 2) is provided in the vicinity of the compression molding device 2.

The compression molding device 2 comprises a stationary die plate section 10 having a stationary die plate 12 for holding a stationary die 11 arranged vertically to a ground surface, a movable die plate section 20 having a movable die plate 22 for holding a movable die 21 arranged vertically to the ground surface, an extending and retracting device 30 for rapidly extending and retracting the movable die plate 22 in a generally horizontal direction relative to the stationary die plate 12, at least one locking device 40 for locking the movable die plate 22 to a respective tie bar 51 at a position where the movable die plate 22 has approached the stationary die plate 12, and at least one die fastening device 50 for advancing the movable die plate 22 toward the stationary die plate 12 so as to fasten the dies 11 and 21 together while a plastic material is compressed and drawn in the mold cavity after the movable die plate 22 has approached the stationary die plate 12 to reach a predetermined position.

The injection device 3 comprises an injection cylinder section 70 for injecting the molten plastic material into the compression molding device 2, and a flow control section 80 for controlling the injection volume of the molten plastic material, the initiation of the injection, etc.

The control device 4 controls the timing of the operations in the compression molding device 2, e.g., the initiation of compression and drawing of the plastic material, etc., and the timing of operations in the injection device 3, e.g., the time of the injection of the molten plastic material, etc.

Figure 1:
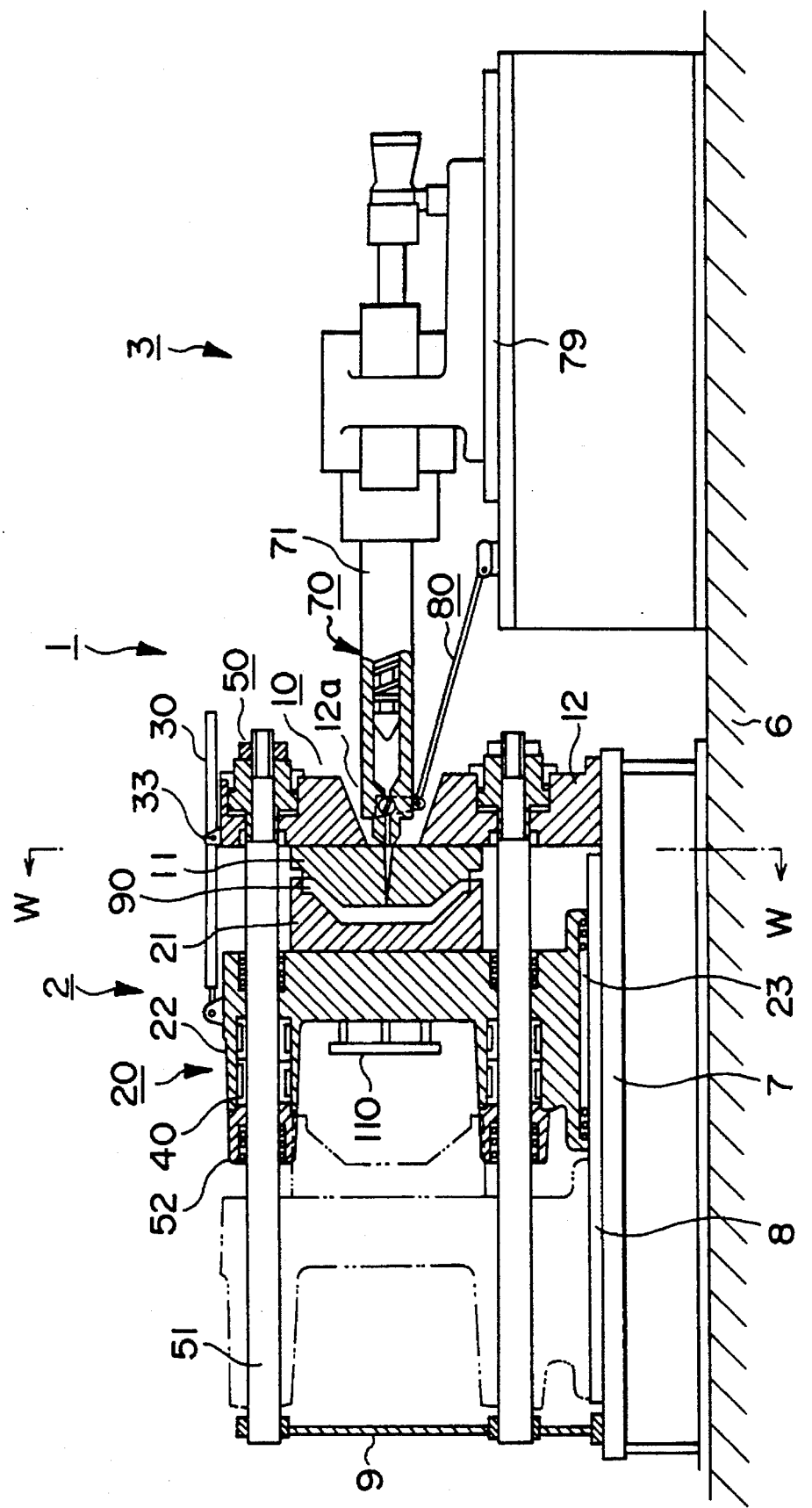
FIG. 1 is a side elevation view, partly in cross section, illustrating an embodiment of a horizontal injection and compression molding apparatus according to the present invention.
Figure 2:
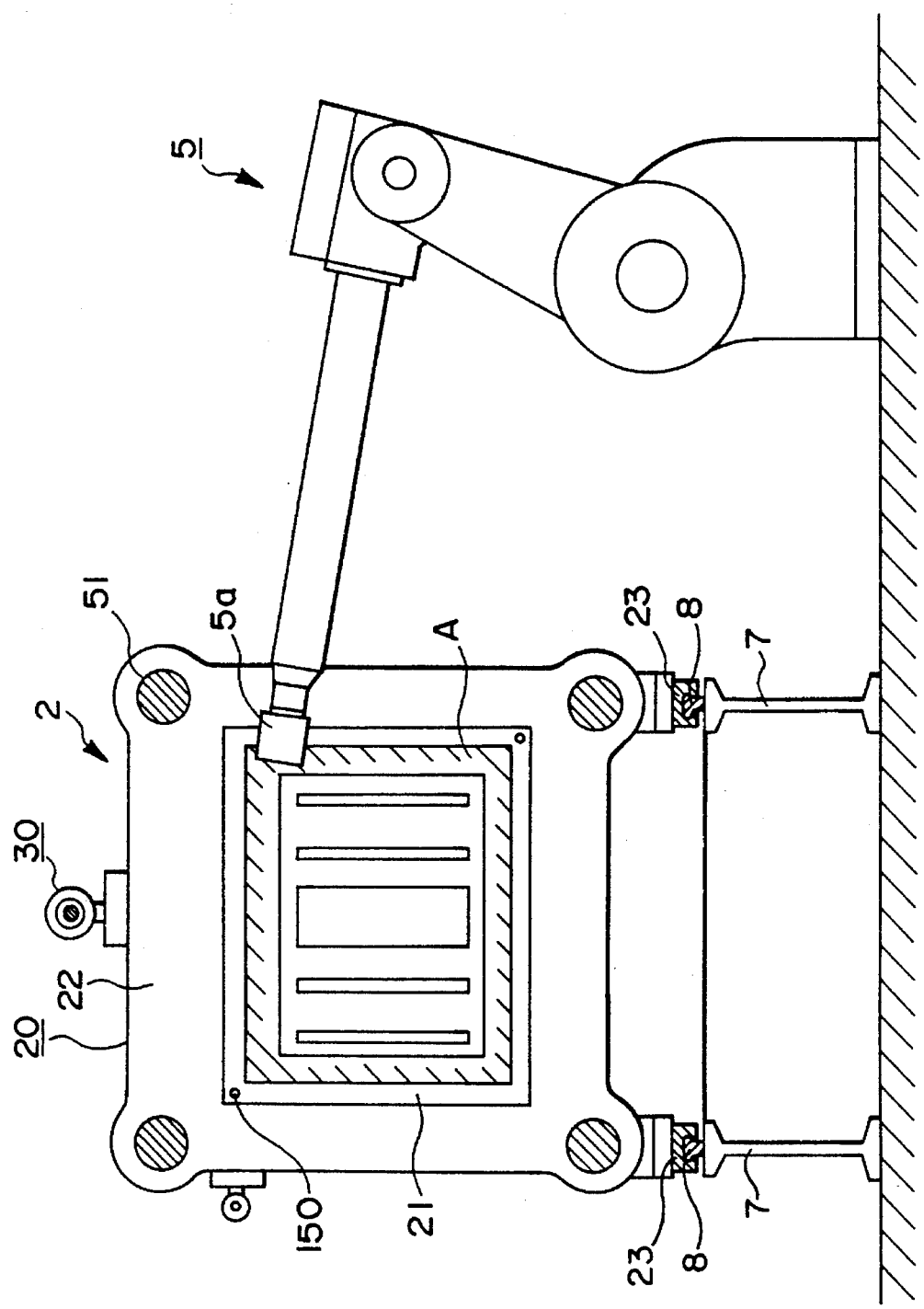
FIG. 2 is a sectional view along line W—W in FIG. 1.

Referring to FIGS. 1 and 2, in the horizontal injection and compression molding apparatus 1, the stationary die plate section 10 is secured onto one end of a bed 7 which is laid in parallel with the ground surface 6, and comprises the stationary die 11 and the stationary die plate 12 for holding the stationary die 11. Further, an attaching part for the extending and retracting device 30 and the die fastening devices 50 are arranged in the stationary die plate section 10.

Two horizontal guide rails 8 are secured to the upper surface of the bed 7, and the movable die plate section 20 is slidably engaged on the guide rails 8. The movable die plate section 20 comprises the movable die 21, the movable die plate 22 for holding the movable die 21, and two linear guide bearings 23 for holding the movable die plate 22. Each linear guide bearing 23 is slidably and hermetically attached to a respective guide rail 8 for slidably guiding the movable die plate 22 on the rolling guide surface of the guide rail 8. The movable die plate section 20 is provided with the locking device 40, an ejector device 110, and an attaching part for the extending and retracting device 30. A support plate 9 for slidably guiding tie bars 51 is secured to the other end of the bed 7.

The movable die plate 22 is provided with linear bearings 52 for slidably guiding the movable die plate 22 on the tie bars 51, and with the locking devices 40 for locking the movable die plate 12 to the tie bars 51.

The tie bars 51 extend through the stationary die plate 12 into the die fastening devices 50 for slidably guiding the movable die plate 22 and for pulling the movable die plate 22 during the die fastening operation. An aperture 12a, for allowing the outlet of a cylinder 71 (which will be denoted as "heating cylinder") to abut against a resin inlet in the stationary die 11, is formed in a substantially central part of the stationary die plate 12. The heating cylinder 71 heats the plastic material, e.g., a thermoplastic resin, which is fed to the injection device 30 and injects the resulting molten plastic material into a mold cavity section 90 which is defined by movable die 21 and stationary die 11.

At least one pin 150 (shown in FIGS. 2 and 5) is secured to the side of the stationary die 11 facing the movable die 21. A corresponding number of holes 151, in which the pins 150 can hermetically fit, are formed in the movable die 21 so that pins 150 guide the movable die 21 when the movable die 21 closely approaches the stationary die 11.

FIG. 3 is an enlarged view showing one of the die fastening devices 50 attached to the stationary die plate 12. Each die fastening device 50 comprises a hydraulic cylinder 55 formed in the stationary die plate 12 and containing an opposite rod type piston 53, with each piston 53 being formed with a hollow hole 53a axially therethrough and being inserted in the cylinder chamber of the respective cylinder 55 in sealing engagement with a cylindrical wall of the cylindrical chamber. A piston cover 54 is inserted in the outer end of the cylinder chamber of cylinder 55 and is secured to the stationary die plate 12 so as to form piston chambers 55a, 55b on the axially opposite sides of the piston 53. A plurality (four in this embodiment, one for each corner part of the stationary die plate 12) of die fastening devices 50 are arranged in the vicinity of the outer peripheral part of the stationary die plate 12. Each tie bar 51 has one end part which is of reduced diameter and which is loosely fitted in the hollow hole 53a of the piston 53 in the respective die fastening device 50. The piston 53 abuts at one end against a radially stepped part 51a on the tie bar 51 and at the other end against a nut 56 screwed onto the outer end of the tie bar 51. The nut 56 is fastened lightly against the piston 53 so that the tie bar 51 can be moved vertically in order to align the center of tie bar 51 at the desired position, after which the nut 56 can be tightened against the piston 53 and then secured by a set screw or the like in the tightened position in order to prevent subsequent rotation of the nut 56.

FIG. 4 is an enlarged view showing a locking device 40 attached to the movable die plate 22 and surrounding a tie bar 51. Holes 22a are formed in the four corner parts of the movable die plate 22, and linear bearings 52a, 52b are disposed therein for slidably guiding the locking device 40 and the movable die plate 22 along the longitudinal axis of the respective tie bar 51. The stationary die plate 12 and the movable die plate 22 are coupled together by the extending and retracting device 30, for rapidly extending and retracting the movable die plate 22 in a generally horizontal direction. The die opening and closing hydraulic cylinder 31 is pivotally connected at the rod side to the movable die plate 22 by means of a pin 32, and at the cylinder side to the stationary die plate 12 by means of a pin 33 (FIG. 1) so that the movable die plate 22 is moved toward and away from the stationary die plate 12 by the retraction and extension, respectively, of the die opening and closing hydraulic cylinder 31.

At least one hydraulic fastener 41 (for example, a hydraulic fastener manufactured by Nitmac E. R. Co.) is inserted into each hole 22a in the movable die plate 22, and is positioned against the radial shoulder at the longitudinal end of the hole 22a by a bearing retainer 42 so as to prevent the fastener 41 from moving in the axial direction of the tie bar 51. The bearing retainers 42 are secured to the movable die plate 22 by suitable means (e.g., bolts, not shown).

Bearing 52a is disposed radially inwardly of the bearing retainer 42, while bearing 52b is disposed radially inwardly of the movable die plate 22 on the side of the locking device 40 remote from the bearing retainer 42 so that the length between the fulcrums of the two bearings 52a, 52b is relatively long, and accordingly, the movable die plate 22 can be smoothly slid by the die opening and closing hydraulic cylinder 31 in the axial direction of the tie bars 51, being guided by the tie bars 51.

Referring now to FIG. 5, a distance sensor 100 for detecting a distance, in a direction parallel to the longitudinal axis of the tie bar 51, between the stationary die plate 12 and the movable die plate 22 is disposed between stationary die plate 12 and movable die plate 22. This distance sensor 100 can measure the positional relationship between the guide rail 8 and the linear guide bearing 23 so that the distance, in the lateral direction as viewed in FIG. 5, between the movable die plate 22 and the stationary die plate 12 can be computed by the control device 4.

As shown in FIG. 5, the injection cylinder section 70 in the injection device 3 is mounted, so as to be slidable in the direction of the stationary die plate 12 in the compression molding device 2, by means of a slider 79 (FIG. 1). The injection cylinder section 70 comprises the heating cylinder 71 which has a cylindrical chamber 71a, and a reciprocable feed screw 72 inserted, in a close contact manner, in the cylindrical chamber 71a. The feed screw 72 is coupled to at least one hydraulic cylinder 73 through the intermediary of a bracket 74 so that the screw 72 can be reciprocally slid in the direction Z by operating the hydraulic cylinders 73, to thereby inject the molten plastic material into the mold cavity 90.

The injection volume of the molten plastic material to be injected can be obtained, for example, by measuring the stroke of the piston rod of the hydraulic cylinder 73 by means of the distance sensor 75 and by computation of the control device 4.

A flow control valve section 80 for controlling the injection flow rate of the molten plastic material, the initiation of the injection, etc., is arranged at the front, or distal, end of the heating cylinder 71 in the heating cylinder section 70. The flow control valve section 80 is composed of a valve 81 tightly, but rotatably, inserted in a spool hole formed in the heating cylinder 71, and a step motor 84 which swings the valve 81 through the intermediary of a rod 82 and a pivotally mounted lever 83.

The control device 4, as shown in FIG. 5 and in FIG. 6, with which another embodiment will be explained later, is connected to the distance sensor 100 between the stationary die plate 12 and the movable die plate 22, a die shifting solenoid selector valve 30a for changing over hydraulic oil for driving the cylinder 31 of the extending and retracting device 30, a locking solenoid valve 40a for changing over hydraulic oil for driving the hydraulic fasteners 41 of the locking devices 40, a die fastening solenoid selector valve 50a for changing over hydraulic oil for driving the piston 53 of the fastening devices 50, a solenoid valve 73a for changing over hydraulic oil for driving feed screw 73 of the injection cylinder section 70, the injection controlling step motor 84 for driving the valve 81 in the flow control valve section 80, a distance sensor 111 disposed in the ejector device 110, and a control device 200 for controlling the deliver device for delivering a molded article A, and controls valves 30a, 40a, 50a, and 73a and motor 84 in accordance with predetermined instructions.

Explanation will be made of the operation of the above-mentioned arrangement. In the event of the replacement of dies, the dies 11 and 21 are removably attached to the stationary die plate 12 and the movable die plate 22, respectively, and then both dies 11, 21 are caused to approach together by the operation of the die opening and closing hydraulic cylinder 31. Then, both dies 11, 21 are aligned with each other by means of the guide pins 100 and are then fastened together by locking devices 40 and tie bars 51. At this time, a determination is made as to whether or not the alignment of both dies 11, 21 has been smoothly carried out and effected. Also, the stationary die 11 and the movable die 21 are positioned in close contact with each other, and the distance between the stationary die 11 and the movable die 21, as indicated by the distance sensor 100, is set to be zero. If the result of the determination is satisfactory, the die closing operation is started. Further, even in the case of a usual start, both dies 11, 21 can be caused to approach together by the operation of the die opening and closing cylinder 31 so as to perform the determination during the starting inspection. Then, the outlet of the heating cylinder 71 is made to abut against the resin inlet in stationary die 11.

In order to start the die closing operation, the movable die plate 22 is made to rapidly approach the stationary die plate 12 from a fully retracted position. When the movable die plate 22 reaches a first predetermined position with respect to the stationary die plate 12, an instruction from the control device 4 is fed to the solenoid selector valve 30a for the die opening and closing hydraulic cylinder 31 so as to stop the supply of hydraulic oil from a pump (not shown), and accordingly, the die opening and closing cylinder 31 is stopped, thereby halting the movement of the movable die plate 22.

Next, an instruction from the control device 4 is fed to the solenoid selector valve 40a for the hydraulic fasteners 41 so that hydraulic oil is fed to the hydraulic fasteners 41 from a pump (not shown), and accordingly, the movable die plate 22 is locked firmly to the tie bars 51. After the completion of the locking by the locking devices 40, an instruction from the control device 4 is fed to the solenoid selector valve 50a for the die fastening devices 50 so as to feed hydraulic oil to the die fastening cylinders 55 from a pump (not shown), and accordingly, the movable die plate 22 is made to approach the stationary die plate 12 by means of the operation of the die fastening cylinders 55. When the movable die plate 22 reaches a second predetermined position, the distance sensor 100 delivers a signal to the control device 4, the movement of the pistons 53 of the die fastening cylinders 55 are stopped by an instruction from the control device 4. At this time, there is still a clearance between the movable die 21 and the stationary die 11 (a faucet slide clearance Y is determined by the thickness and size of a molded article and is generally in the range of about 2 to about 30 mm) so that the mold cavity 90 is larger at the time of the stopping of the movable die 21 at the second predetermined position than during the subsequent compression molding.

When the movable die 21 reaches the second predetermined position, an instruction is delivered to the step motor 84 for the flow control valve section 80 so as to swing the valve 81 to an at least partially opened position to permit the injection of the molten plastic material into the mold cavity 90 through the resin inlet in the stationary die 11. At this time, the molten plastic material is fed from the heating cylinder 71 into an enlarged space cavity 90 which is at least substantially at atmospheric pressure, and accordingly, the molten plastic material can be injected at a relatively low injection pressure.

When a predetermined quantity of the molten plastic material has been injected into the mold cavity 90, an instruction from the control device 4 is fed to the solenoid selector valve 50a for the die fastening devices 50 in accordance with a signal from the distance sensor 75 attached to the screw 72, the hydraulic cylinder 73 or the like, and accordingly, hydraulic oil is fed to the die fastening cylinders 55 from a pump (not shown) so as to cause the movable die plate 22 to further approach the stationary die plate 12 by means of the die fastening cylinders 55. Accordingly, the movable die 21 is moved towards its fully closed position at a predetermined speed and a predetermined pressure so as to compress and drawn the plastic material into every nook and corner of the closed mold cavity 90. Thus, since the molten plastic material flows in the wide cavity section 90 under compression and drawing, the fluidity can be replenished, thereby it is possible to perform molding without deteriorating the physical property of the plastic material. Further, the pressure applied to the plastic material becomes uniform, and the density thereof also becomes uniform so that the molded article can be made with less distortion and warping. Thus, by applying the press molding while performing the injection molding, the molding of a thin wall from a plastic material having a low fluidity can be made. Also, with the inclusion of the opening, bubbles can be introduced into the molding article so as to obtain a flexible molded article.

When a predetermined quantity of the molten plastic material corresponding to the quantity of plastic material in the molded article A has been injected into the mold cavity 90, the control device 4 delivers an instruction to the step motor 84 for the flow control valve section 80 in the injection device 3, and therefore, the valve 81 is swung to its closed position so as to stop the injection of the molten plastic material into the mold cavity 90. At this time, the movable die 21 is still being moved towards its fully closed position at the predetermined speed and pressure, and the plastic material is compressed and drawn into every nook and corner of the mold cavity 90 so as to increase the density of the plastic material. When the dies 11, 21 abut against each other in the fully closed position, the movement of the pistons 53 of the die fastening cylinders 55 is stopped, and this condition is maintained, until the plastic resin material has cooled to solidification, in order to apply a hold pressure to the plastic material. After the molded article A has been cooled to solidification, the operation is carried out in an order reverse to that mentioned above. That is, the movable die 21 is retracted by the die fastening devices 50, and the die opening and closing hydraulic cylinder 31 is operated after the hydraulic fastening devices 41 release the locking of the movable die plate 22 to the tie bars 51, whereby the movable die 21 is returned to its original fully retracted position.

The ejector device 110 can be operated during or after retraction of the movable die 21 so as to separate the molded part A from the dies (as shown in FIG. 2). When the ejector device 110 completes it operation, a signal is delivered to the control device 4 from the distance sensor 111 so that the delivery device 5 incorporated in the horizontal compression molding device 2 is operated. Accordingly, the molded article A is picked up between the stationary die 11 and the movable die 21, vertically to the ground surface or laterally, and then the molded article A is transferred away from the molding operation. It is sufficient that a gripping element 5a of the delivery device 5 can grip only one end of the molded article A. Accordingly, since the molded article can be easily gripped, it is possible to facilitate the use of a robot.

Next explanation will be made of a second embodiment according to the present invention. The second embodiment has a construction similar to that of the first embodiment, as far as shown by FIGS. 1, 3 and 4. However, it is not necessary to attach the delivery device 5 and its related parts shown in FIGS. 2 and 5. Parts of the second embodiment which are the same as those in the first embodiment have been designated by the same reference characters, so that a repetition of the explanation thereof is substantially omitted.

Figure 6:
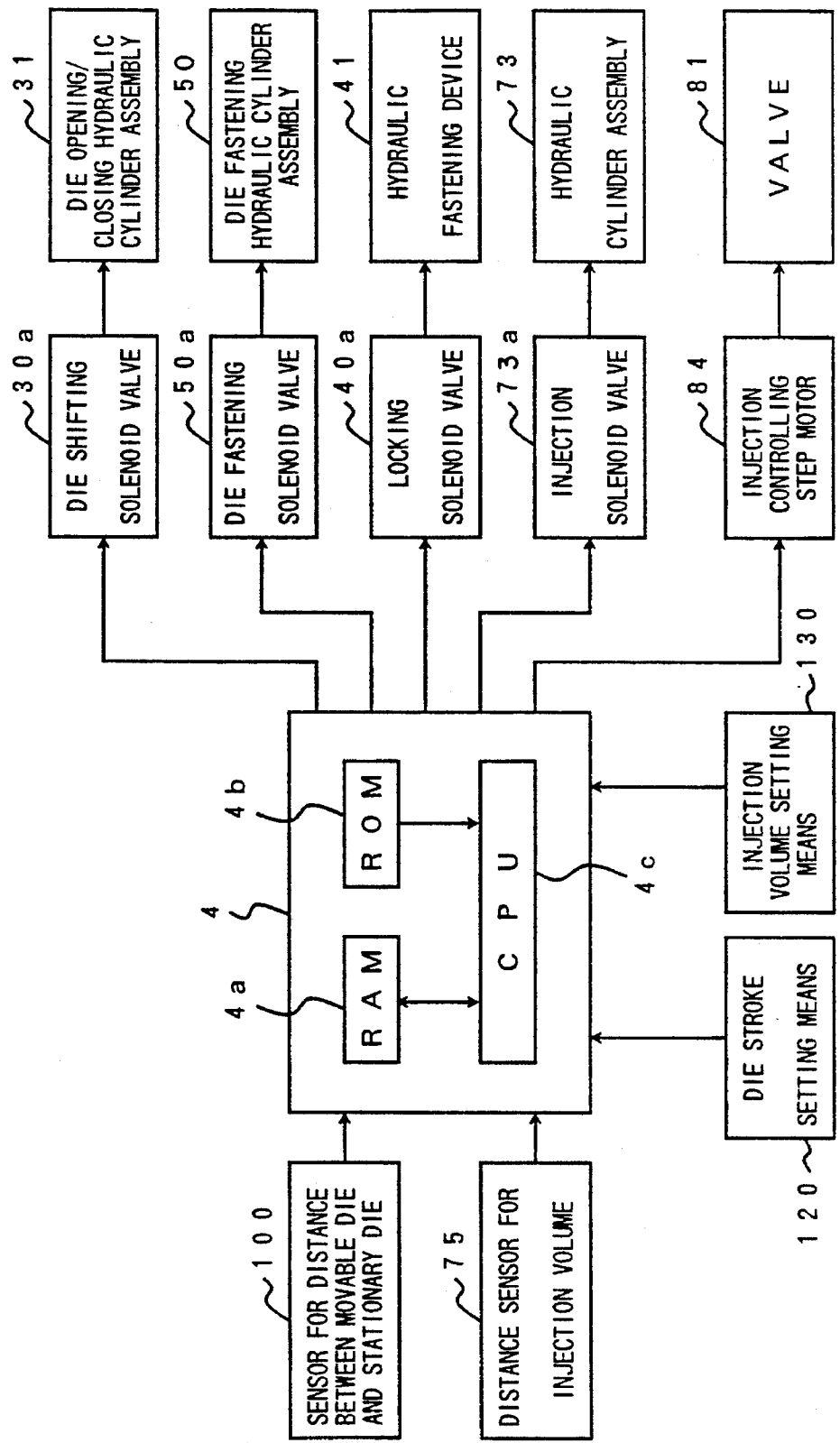
FIG. 6 is a block diagram showing a control device section according to the present invention.

A control device 4 in the second embodiment, as shown in FIG. 6, is composed of RAM 4a, ROM 4b, and a CPU 4c, and the control device 4 is connected to the distance sensor 100 between the stationary die 11 and the movable die 21, the solenoid selector valve 30a for changing over hydraulic oil for driving the extending and retracting device 30, a solenoid selector valve 40a for changing over hydraulic oil for driving the locking devices 40, and a solenoid selector valve 50a for changing over hydraulic oil for driving the fastening devices 50, a solenoid valve 73a for changing over hydraulic oil for driving the screw 73 in the injection cylinder section 70, a distance sensor 75 for measuring a stroke of the hydraulic cylinder 73 for determining the injection quantity of the molten plastic material to be fed, the step motor 84 for driving the valve 81 in the flow control valve section 80, a die stroke setting means 120 for inputting operational positions and speeds of the extending and retracting device 30 and the die fastening device 50, a timing of injection of the molten plastic material or the like in accordance with a travel distance of the movable die 21, and an injection volume setting means 130 for setting an injection volume of the molten plastic material, and controls each of valves 30a, 40a, 50a, and 73 and motor 84 in accordance with predetermined instructions.

Explanation will be made of the operation of the above-mentioned arrangement. In the event of the replacement of dies, the dies 11, 21 are removably attached to the stationary die plate 12 and the movable die plate 22, respectively, and then both dies 11, 21 are caused to approach together by the operation of the die opening and closing hydraulic cylinder 31. Then, both dies are aligned with each other by means of the guide pins 150 and are then fastened together. At this time, a determination is made as to whether or not the alignment of both dies has been smoothly carried out and effected. Also, the stationary die 11 and the movable die 21 are positioned in close contact with each other, and the distance between the stationary die 11 and the movable die 21, as determined by means of the distance sensor 100, is set to be zero. If the result of the determination is satisfactory, the die closing operation is started. Further, even in the case of a usual start, dies 11, 21 can be caused to approach together by operating the die opening and closing cylinder 31 so as to perform the determination during the starting inspection. Then, the outlet of the heating cylinder 71 is made to abut against the resin inlet in the stationary die 11.

Figure 7:
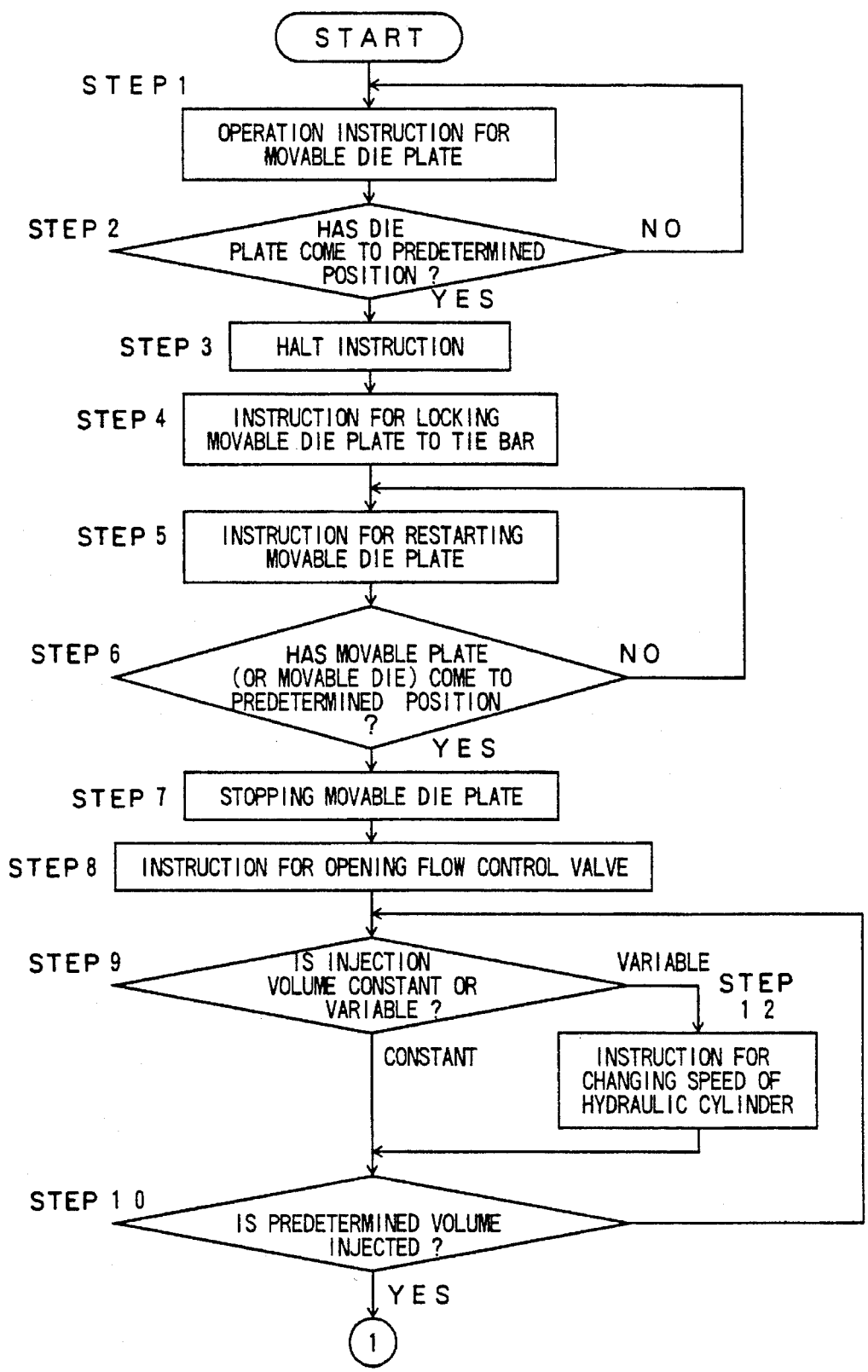
FIG. 7 is a flow chart explaining an injection and compression molding method according to the present invention.
Figure 8:
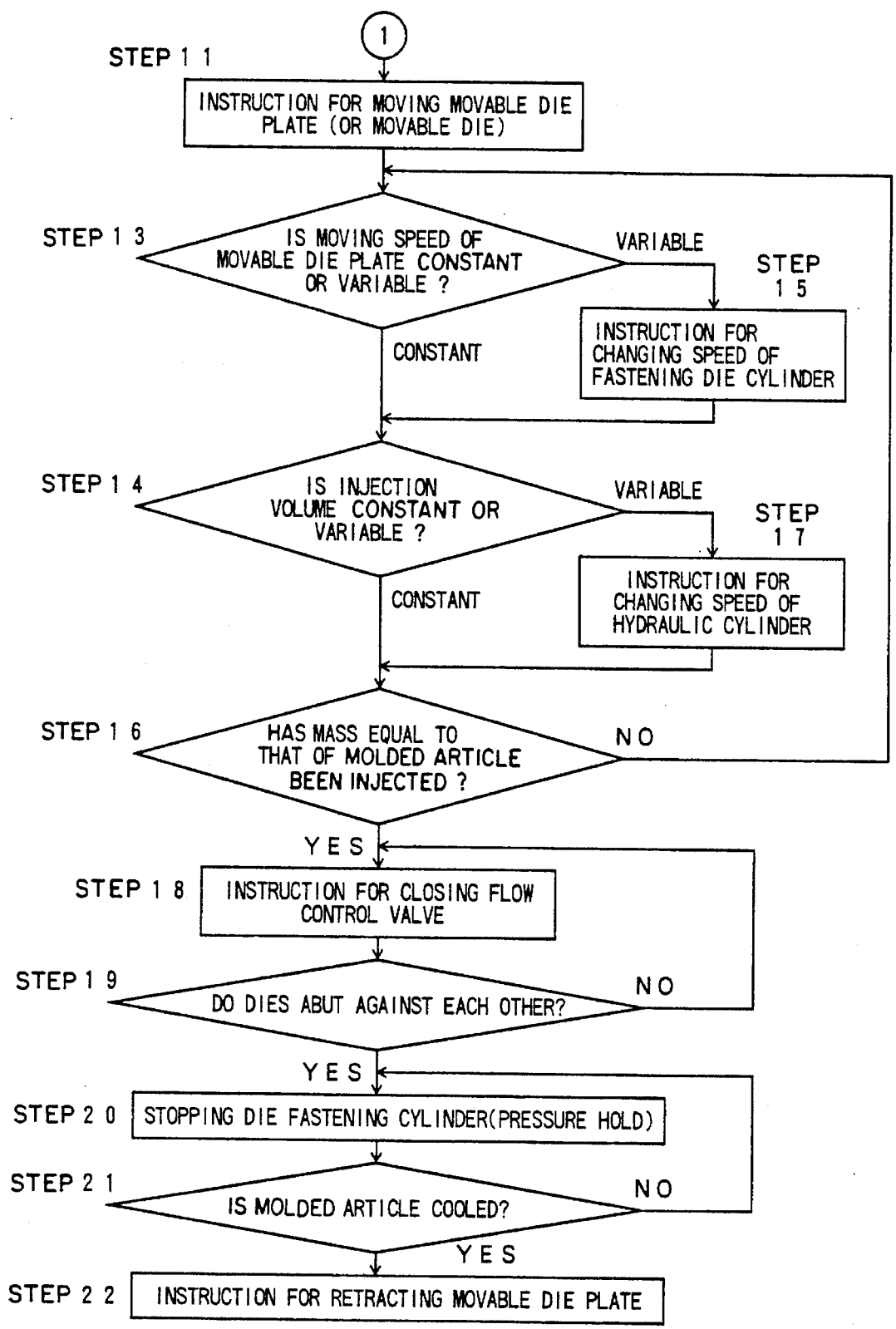
FIG. 8 is a flow chart explaining an injection and compression molding method according to the present invention.

FIGS. 7 and 8 show one example of a flow chart for explaining an injection and compression molding method for a plastic material. In order to start the die closing, at step 1, the retracted movable die plate 22 is caused to rapidly approach the stationary die plate 22 by means of the die opening and closing cylinder 31. At step 2, a determination as to whether or not the movable die plate 22 has reached a first predetermined position with respect to the stationary die plate 12 is made in accordance with a signal from the distance sensor 100. If the movable die plate 22 has reached the first predetermined position, at step 3 an instruction from the control device 4 is fed to the solenoid valve 30a for the die opening and closing cylinder 31 so as to stop the supply of hydraulic oil from a pump (not shown), whereby the die opening and closing cylinder 31 is stopped to thereby halt the movement of the movable die plate 22. If the movable die plate 22 has not reached the first predetermined position, the procedure is returned to step 1. When the movable die plate 22 is stopped at step 3, an instruction from the control device 4 is fed to the solenoid control valve 40a for the hydraulic fasteners 41 at step 4, and accordingly, hydraulic oil is fed to the hydraulic fasteners 41 from a pump (not shown) so that the movable die plate 22 is firmly locked to the tie bars 51 by the hydraulic fasteners 41. At step 5, after the locking by the locking devices 40 is completed at step 4, an instruction from the control device 4 is fed to a solenoid control valve 50a for the die fastening devices 50, and accordingly, hydraulic oil is fed to the die fastening cylinders 55 from a pump (not shown) so as to cause the movable die plate 22 to further approach the stationary die plate 12 by the die fastening cylinders 55. At step 6, a determination is made as to whether or not the movable die plate has reached a second predetermined position, and if it has reached the second predetermined position a signal from the distance sensor 100 is fed to the control device 4. Thus, at step 7, the pistons of the die fastening cylinders 55 are again stopped in accordance with a signal from the control device 4. If the movable die plate 22 has not reached the second predetermined position, the procedure is returned to step 5, and then a determination is made as to whether or not the movement instruction is continued, and, if so, the procedure is shifted to step 6. At this time, a clearance between the movable die 21 and the stationary die 11 is set (a faucet slide clearance Y is set in accordance with the size and thickness of a molded article so as to be in the range of about 2 to about 30 mm), and the movable die plate 22 is stopped with the mold cavity 90 in an enlarged condition. In the above-mentioned embodiment, although the change-over is made between the extending and retracting device 30 and the die fastening device 50 at step 3, the change-over between the extending and retracting device 30 and the die fastening device 50 can be made when step 7 is stopped.

At step 8, after the movable die 21 is stopped at the second predetermined position, an instruction from the control device 4 is delivered to the step, motor 84 for the flow control valve section 80 in the injection device 3 to operate the valve 81 to an at least partially opened position so as to start the injection of the molten plastic material into the mold cavity 90 through the resin inlet in the stationary die 11. At this time, an instruction can be fed to the solenoid control valve 73a for the hydraulic cylinder 73, and accordingly, hydraulic oil is fed into the hydraulic cylinder 73 from a pump (not shown), so as to slide the screw 72 in the direction Z in order to increase the pressure of the molten plastic material to a predetermined injection pressure. Thus, the injection is carried out after the amount of the resin to be fed into the mold cavity 90 has been measured.

At this time, since the molten plastic material is injected from the heating cylinder 71 into the mold cavity 90 having an enlarged space exposed to atmospheric pressure, the injection can be made at a relatively low pressure. At step 9, a determination is made as to whether a set signal from the injection volume setting means 130 for setting the injection volume of the molten plastic material indicates that the injection volume is constant or variable. If it is constant, the procedure is advanced directly to step 10, where a determination is made as to whether or not the molten plastic material is to be injected into the mold cavity section 90 in a predetermined quantity in accordance with a signal from the distance sensor 75 attached to the screw 72, the hydraulic cylinder 73 or the like. If a predetermined quantity is to be injected at step 10, an instruction from the control device 4 is fed to the solenoid control valve 50a for the die fastening devices 50 so as to feed hydraulic oil into the die fastening cylinders 55 from a pump (not shown) in order to cause the movable die plate 22 to approach the stationary die plate 12 by the operation of die fastening cylinder 55 at step 11 (shown in FIG. 8). When the injection volume is determined to be variable at step 9, the procedure is advanced to step 12 where the volume of hydraulic oil fed into the hydraulic cylinder 73 from a pump (not shown) is increased or decreased so as to change the injection volume to the desired value.

After the injection volume of the molten plastic material is increased or decreased at step 12, the procedure is shifted to step 10. If a signal from the distance sensor 75 attached to the screw 72, the hydraulic cylinder 73 or the like, indicates in step 10 that the molten plastic material is not to be injected in a predetermined volume, the procedure is returned to step 9.

At step 13, whether the moving speed of the movable die plate 22 during the die fastening operation, which is set by the die stroke setting means 120, is constant or variable is determined, and if it is constant, the procedure is advanced to step 14; but if the moving speed is to be varied, the supply volume of hydraulic oil into the die fastening devices 50 from a pump (not shown) is increased or decreased so as to change the moving speed to the desired value.

At step 14, which is similar to step 9, a determination is made as to whether a setting signal from the injection volume setting means 130 indicates that the injection volume is to be constant or to be varied, and if it is to be constant, the procedure is advanced directly to step 16 where a determination is made, as to whether or not the molten plastic material is to be injected into mold cavity 90 in a predetermined quantity corresponding to the desired quantity of material in the molded article, in accordance with a signal from the distance sensor 75 attached to the screw 72, the hydraulic cylinder 73 or the like. If the injection volume is to be varied at step 14, the procedure is advanced to step 17 where the hydraulic oil fed into the hydraulic cylinder 73 from a pump (not shown) is increased or decreased so as to change the injection volume to the desired value. After the injection volume of the molten plastic material is increased or decreased at step 17, the procedure is shifted to step 16.

The movable die 21 is moved towards its closed position at a predetermined speed and a predetermined pressure while the molten plastic material is being injected, and accordingly, the plastic material is compressed and drawn into every nook and corner of the mold cavity 90. Since the plastic material is compressed and drawn at a predetermined flow rate in the enlarged cavity 90, the fluidity can be replenished so that the molding can be made without deteriorating the physical property of the plastic material. Further, since the pressure applied to the plastic material becomes uniform and since the density of the plastic material also becomes also uniform, a molded article can be made with less distortion or warping. Thus, by applying the press molding while performing the injection molding, the molding of an article with a thin wall can be made from a plastic material having a low fluidity.

At step 16, a determination is made as to whether or not a quantity of the molten plastic material corresponding to the desired quantity of material in the molded article has been injected. If the desired quantity has been injected, an instruction from the control device 4 is delivered at step 18 to the step motor 84 for the flow control valve section 80 in the injection device 3, and accordingly, the valve 81 is actuated to its fully closed position so as to stop the injection of the molten plastic material. If the desired quantity has not yet been injected at step 16, the procedure is returned to step 13.

The movable die 21 is moved toward its closed position at a predetermined speed and a predetermined pressure after the flow control valve section 80 is closed, and the plastic material is compressed and drawn so as to increase its density. In this condition, a determination is made at step 19 as to whether or not the dies 11, 21 abut against each other. If they do abut against each other, the pistons 53 of the die fastening cylinders 55 are stopped at step 20, and this condition is maintained until the plastic material resin is cooled to solidification. Accordingly, a hold pressure is applied to the plastic material. If they do not abut against each other, the procedure is returned to step 18.

At step 21, a determination is made as to whether or not the molded article has cooled sufficiently, and if it has cooled sufficiently, the operation is continued in an order reverse to that described above; that is, the movable die plate 22 is retracted by the die fastening devices 50, and the die opening and closing hydraulic cylinder 31 is operated after the hydraulic fasteners 41 release the locking. Thus, a retract instruction is issued at step 22 so that the movable die 21 is returned to its original fully retracted position. If the article has not cooled sufficiently, the procedure is returned to step 20 so as to maintain the hold pressure.

Figure 9:
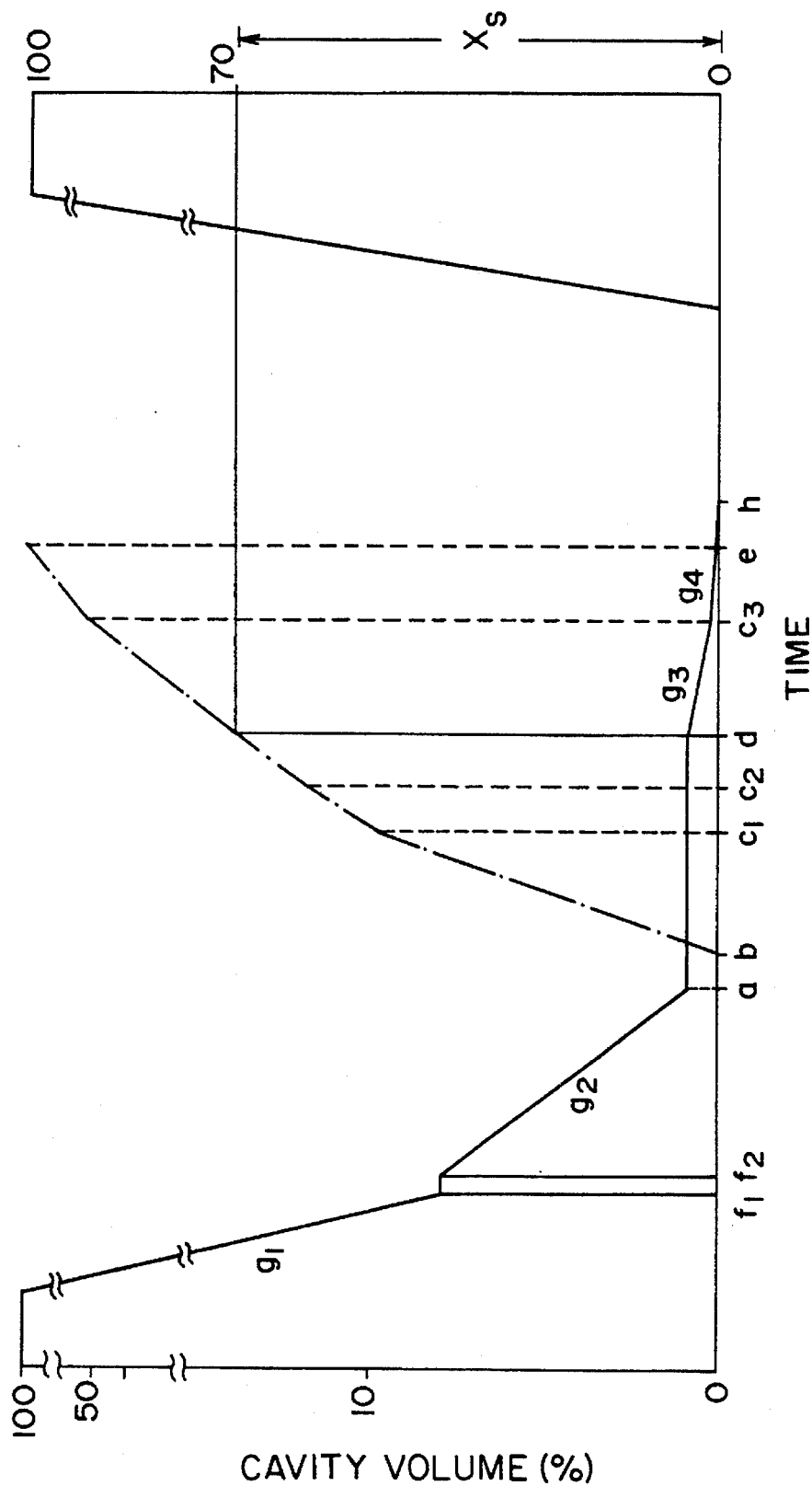
FIG. 9 is a view illustrating one example of a time chart according to the present invention.

The time chart of the above-mentioned embodiment is shown in FIG. 9.

In the above-mentioned embodiment, the movable die plate 22 is initially stopped at step 3, but control can also be effected as follows. When the movable die plate 22 reaches at a position just before the first predetermined position of step 2, a decelerating valve or a brake (not shown) can be operated (step 1a) in order to decelerate the movable die plate 22 until the latter comes to the first predetermined position. After the movable die plate 22 has reached the first predetermined position at step 2, the procedure can be shifted to step 4, where the locking devices 40 are operated during movement of the movable die plate 22 so that the operation is changed over from the extending and retracting device 30 into the die fastening devices 50. Further, at step 7, the movable die plate 22 is again stopped. However, before it is stopped at this second predetermined position, the flow control valve 81 can be opened at least partially so as to initiate the injection of the molten plastic material during or before the stopping of the movable die plate 22 at the second predetermined position. Thus step 8 can precede step 7.

Next, explanation will be made, with reference to FIGS. 10A–10G, of a second embodiment of the injection control method which uses different dies. A stationary die 211 is secured to the stationary die plate 12. A movable die 221 is attached to the movable die plate 22, and each of at least one slide die 222 is tightly, but reciprocally, inserted into a respective cavity in the movable die 221 so that each slide die 222 is positioned as shown when it is extended. That is, each slide die 222 is extended to the position shown in FIG. 10A by a spring 223 which is compressed when the slide dies 222 abut against the stationary die 211 so that the slide dies 222 slide toward the left in FIGS. 10A–10G.

Next explanation will be made of the operation of the second embodiment. A reference character within parentheses indicates a position on the time chart shown in FIG. 9.

Figure 10:
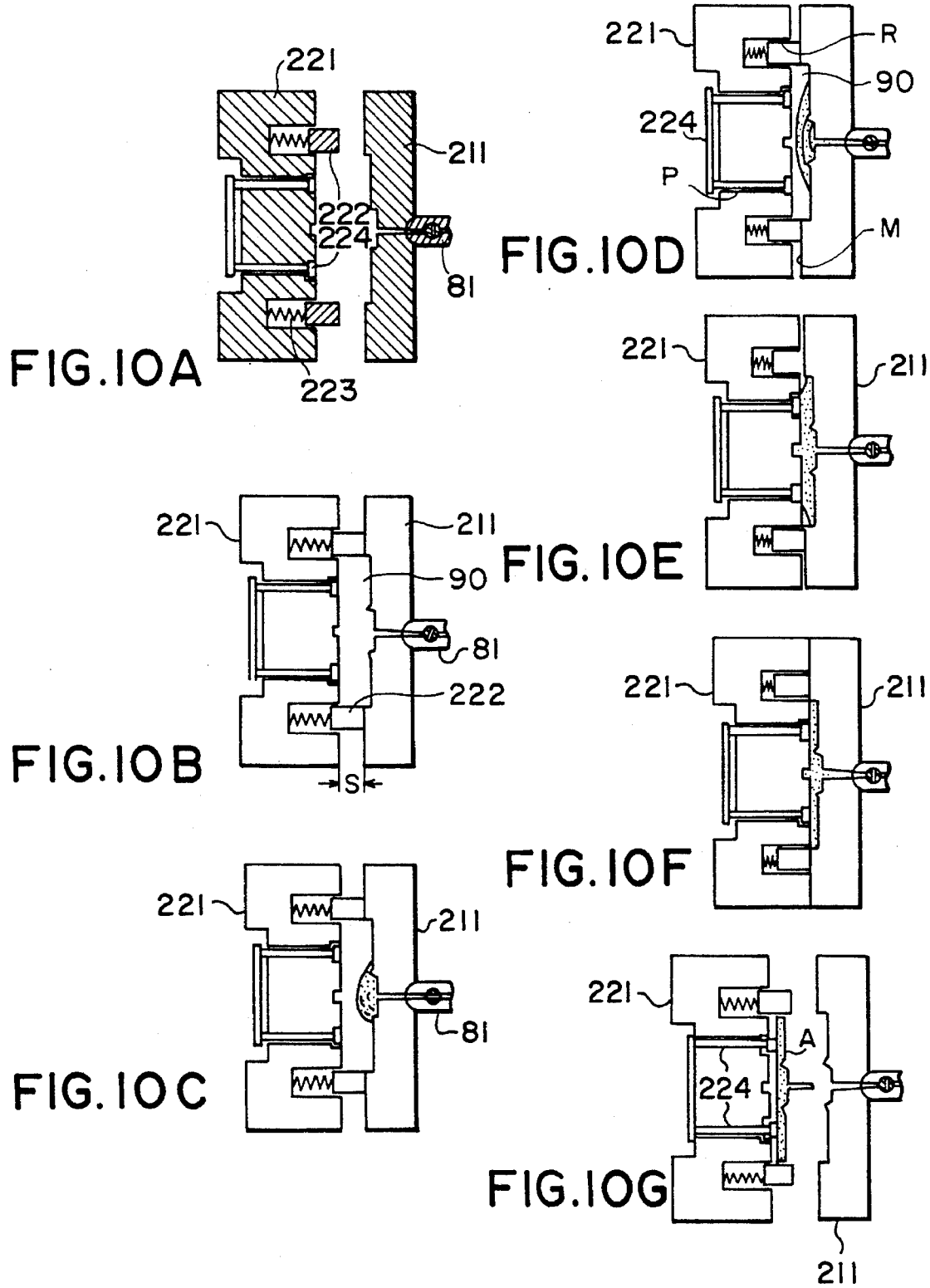

FIG. 10A shows a fully opened condition of the dies 211, 221 (i.e. fully retracted position of the movable die 221) after the previously molded article A (for example, a molded article having a length of 1,000 mm, a width of 150 mm, and a thickness of 0.2 mm) has been ejected. This corresponds to time zero and 100% stroke position of the extension/retraction cylinder 31. The cylinder 31 is then actuated (stroke $g_1$) to move the movable die 221 towards the stationary mold 211. At time point ($f_1$), the movable die 221 is stopped at the first predetermined position to permit the die fastening devices 50 to secure the movable die 221 to the tie bars 51. At time point ($f_2$) the cylinder 31 is again actuated (stroke $g_2$) to move the movable die 221 further towards the stationary die 211.

FIG. 10B shows that the movable die 221 has been moved from its fully retracted position towards the stationary die 211 until it reached a stopped condition at the second predetermined position in which the slide dies 222 abut against the stationary die 211 to form a mold cavity 90 having a space corresponding to this predetermined stroke position. At this moment (time point a), the valve 81 is closed, and accordingly, no molten plastic material is injected into the mold cavity 90. Subsequently, the injection of molten plastic material is initiated by opening valve 81 (time point b).

FIG. 10C shows the movable die 221 stopped at the second predetermined position, with the valve 81 in the at least partially opened condition while the screw 72 is being advanced so as to initiate the injection of the molten plastic material into the mold cavity 90 (between time points b and d). The actual amount of molten resin which has been injected into the mold cavity is periodically determined, e.g., at time points ($C_1$), ($C_2$), (d), ($C_3$), and (e).

FIG. 10D shows that the movement (stroke $g_3$) of the movable die 221 from the first predetermined position towards the stationary die 211 is activated at the time (time point d) when a predetermined ratio of the amount of molten plastic material actually injected to the desired total injection quantity is achieved, with the injection of molten plastic material continuing while the movable die moves further towards the stationary die 211 (time period between time point d and time point $C_3$). The speed of movement of the movable die 221 can be reduced at time point ($C_3$) such that the stroke ($g_4$) is conducted at a slower speed than the stroke ($g_3$). During this time period, the injection can be made at a relatively low pressure as the pressure in mold cavity 90 is at atmospheric pressure.

During the time period between time point (d) and time point (e), the movable die 221 is continuously moved towards the stationary die 211 while the molten plastic material is injected, and accordingly, the drawing by press and the supply of the molten plastic material by injection can be simultaneously made. In this phase, air in the mold cavity 90 is discharged through a gas passage M on a parting line, through a clearance P at each of the ejector pins 224, and through a clearance R at each of the slide dies 222.

FIG. 10E shows the condition wherein the quantity of the molten plastic material actually injected is equal to the desired quantity of plastic material in the molded article A, and accordingly, the valve 81 is closed (time point e).

FIG. 10F shows the condition wherein the press molding is completed as the movable die 221 and stationary die 211 have made contact with each other (time point h). As the total injection quantity can be equal to the mass of the molded article, the injection of an extra quantity of the molten plastic material is not required.

Even though the injection of the molten resin is completed at time point (e), the movable die 221 is still moved until time point (h) so that the molten plastic material is charged into every nook and corner of the mold cavity 90 as the plastic material is being compressed.

FIG. 10G shows the condition wherein the movable die 221 has been retracted so as to separate the slide dies 222 from the stationary die 211 while the ejector pins 224 have been projected outwardly from the movable die 221 so as to eject the molded article A from the movable die 221. The molding procedure is then repeated, beginning with the condition shown in FIG. 10A.

Figure 11:
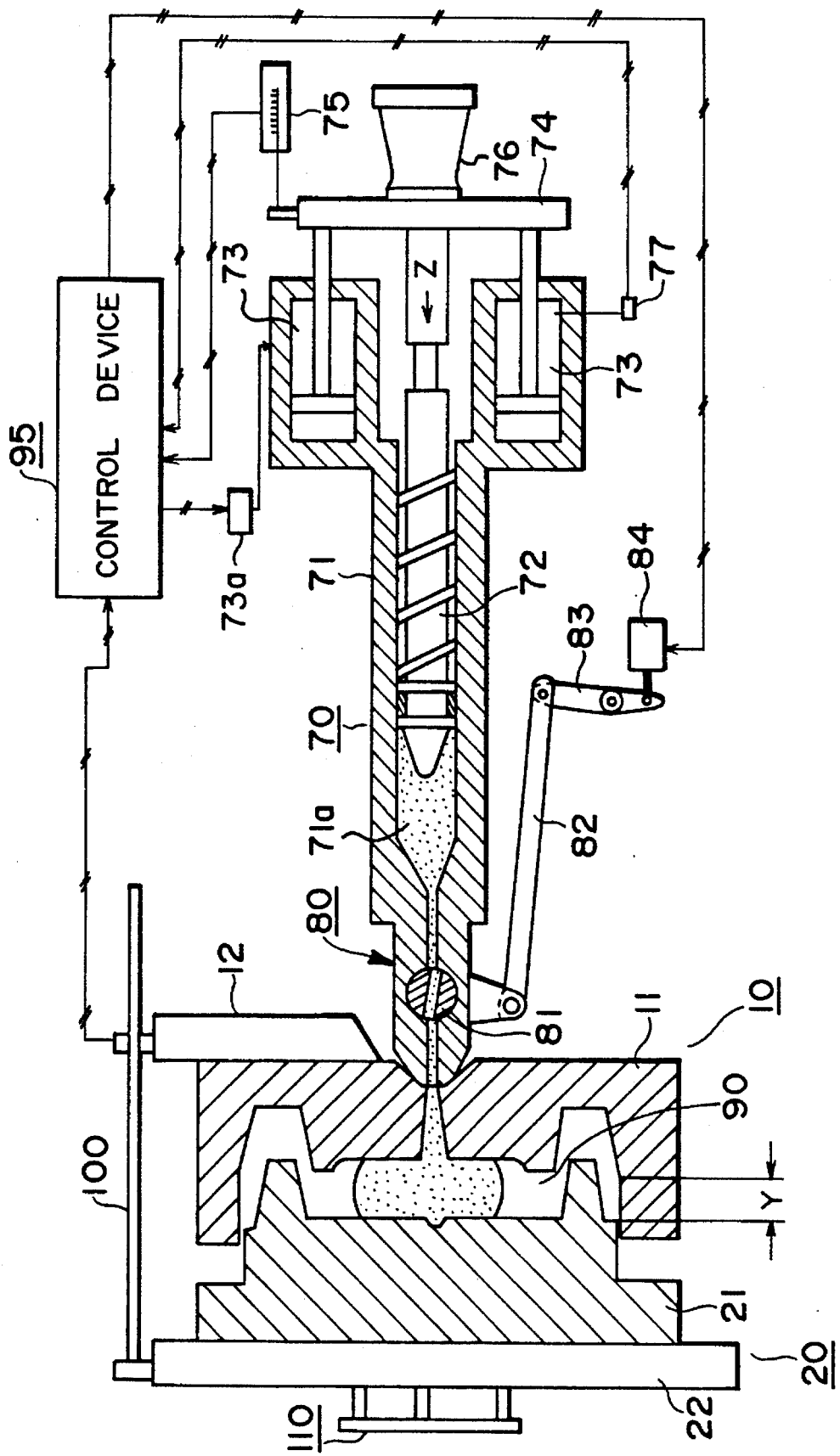
FIG. 11 is a schematic view illustrating another embodiment of the injection and compression molding apparatus according to the present invention.

Next explanation will be made of a third embodiment, for which an injection and compression molding apparatus is illustrated in FIG. 11, with an injection volume control method therefor being illustrated in FIG. 12. Elements which are the same as those in the first embodiment have been designated with the same reference characters, and the repetition of the explanation therefor is substantially omitted.

Referring to FIG. 11, an injection cylinder section 70 is attached to a slider 79 (FIG. 1) so that heating cylinder 71 is slidable in the direction of the stationary die 11. A feed screw 72 is reciprocally fitted in the cylindrical chamber 71a of the heating cylinder 71 of the injection cylinder section 70 in a close contact manner, and is coupled to at least one hydraulic cylinder 73 through the intermediary of bracket 74. The screw 72 is slid in chamber 71a in the direction Z by driving the hydraulic cylinders 73, to thereby inject the molten plastic material into the mold cavity 90. A pressure sensor 77 is attached to one of the hydraulic cylinder 73 in order to measure the hydraulic pressure in the cylinders 73 and thus ascertain the pressure of the molten plastic material in the portion of chamber 71a between the distal end of screw 72 and the valve section 80.

As shown in FIG. 12, a check valve 65 is arranged at the front, or distal, end part 72a of the feed screw 72. The check valve 65 is composed of an annular valve seat 66, a counterflow preventing ring 67 and a screw head 68. In the check valve 65, the screw head 68, onto which the ring 67 is loosely fitted, is screwed into the distal end part 72a of the feed screw 72 such that valve seat 66 constitutes a radially extending annular shoulder at the joindure of the screw head 68 and feed screw 72. Thus the check valve 65 has a closed position in which the counterflow preventing ring 67 abuts valve seat 66 and an opened position wherein the ring 67 is separated from the valve seat 66.

During the measurement operation for achieving the desired injection volume, the screw 72 is retracted in the direction U, and the check valve 65 separates the ring 67 from the valve seat 66 so as to form a clearance K representing the effective opening of the check valve 65. The screw 72 is rotated by a hydraulic motor 76 to which hydraulic oil is fed from a variable displacement pump (not shown) in accordance with an instruction from a control device 95. As the screw 72 is rotated while it is being retracted, molten resin is fed to the left in FIG. 12A (in the direction of the arrow Q) through this clearance K in the open check valve 65 into the portion of chamber 71a between the ring 67 and valve section 80. Then, at the initiation of the injection operation, the ring 67 is pressed to the right in FIG. 12B by the reaction force of the pressure of the molten resin between the check valve 65 and the outlet valve 81, so as to force the ring 67 into close contact with the valve seat 66. Accordingly, the clearance K between the ring 67 and the valve seat 66 is eliminated, so as to inhibit the counterflow of the molten resin. Further advancing of the feed screw 72 causes the pressure of the molten resin in the portion of the heating cylinder between the counterflow preventing ring 66 and the flow control valve 81 to increase to a predetermined value.

Figure 13:
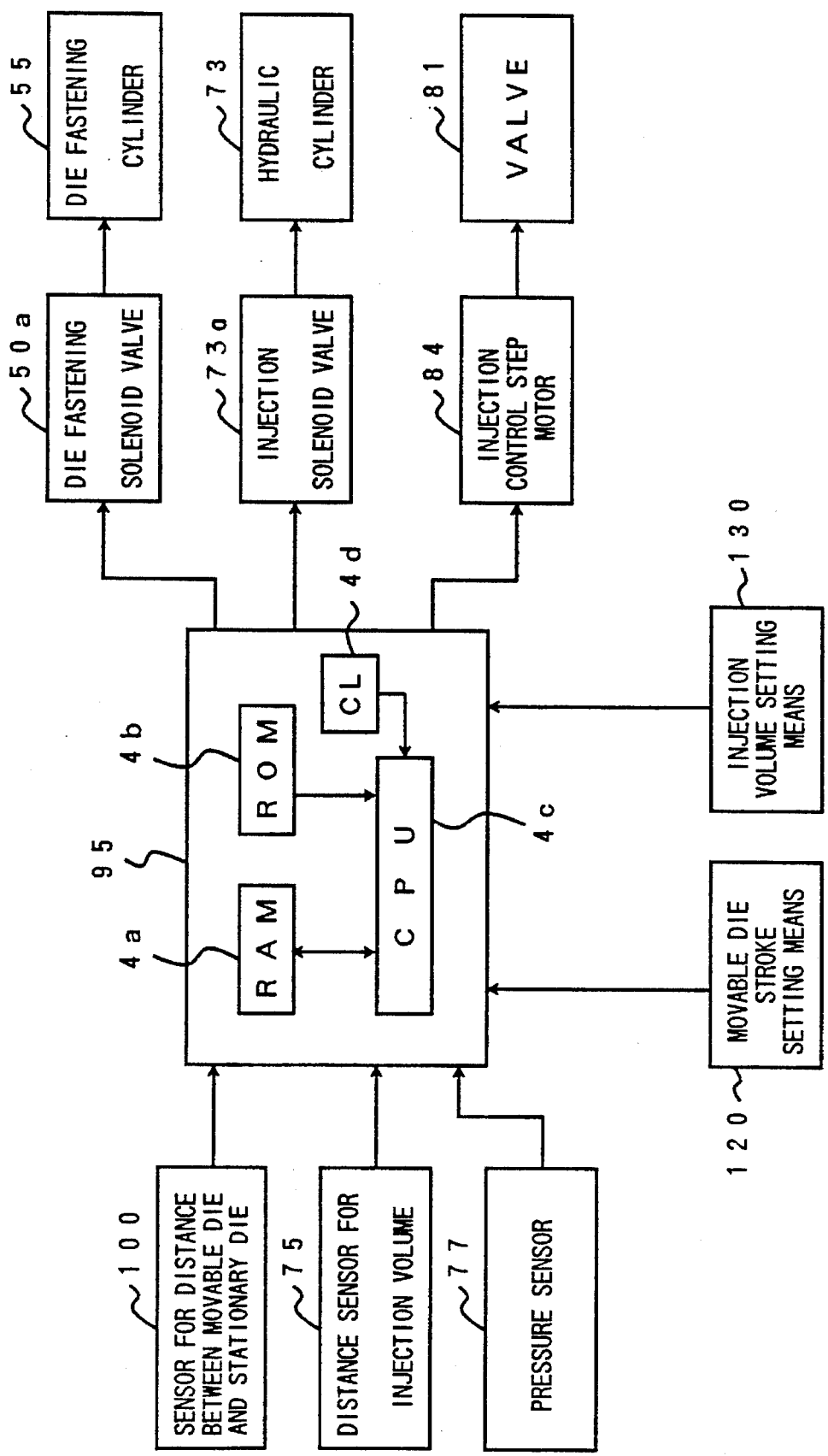
FIG. 13 is a block diagram showing a control device in accordance with another embodiment of the invention.
Figure 14:
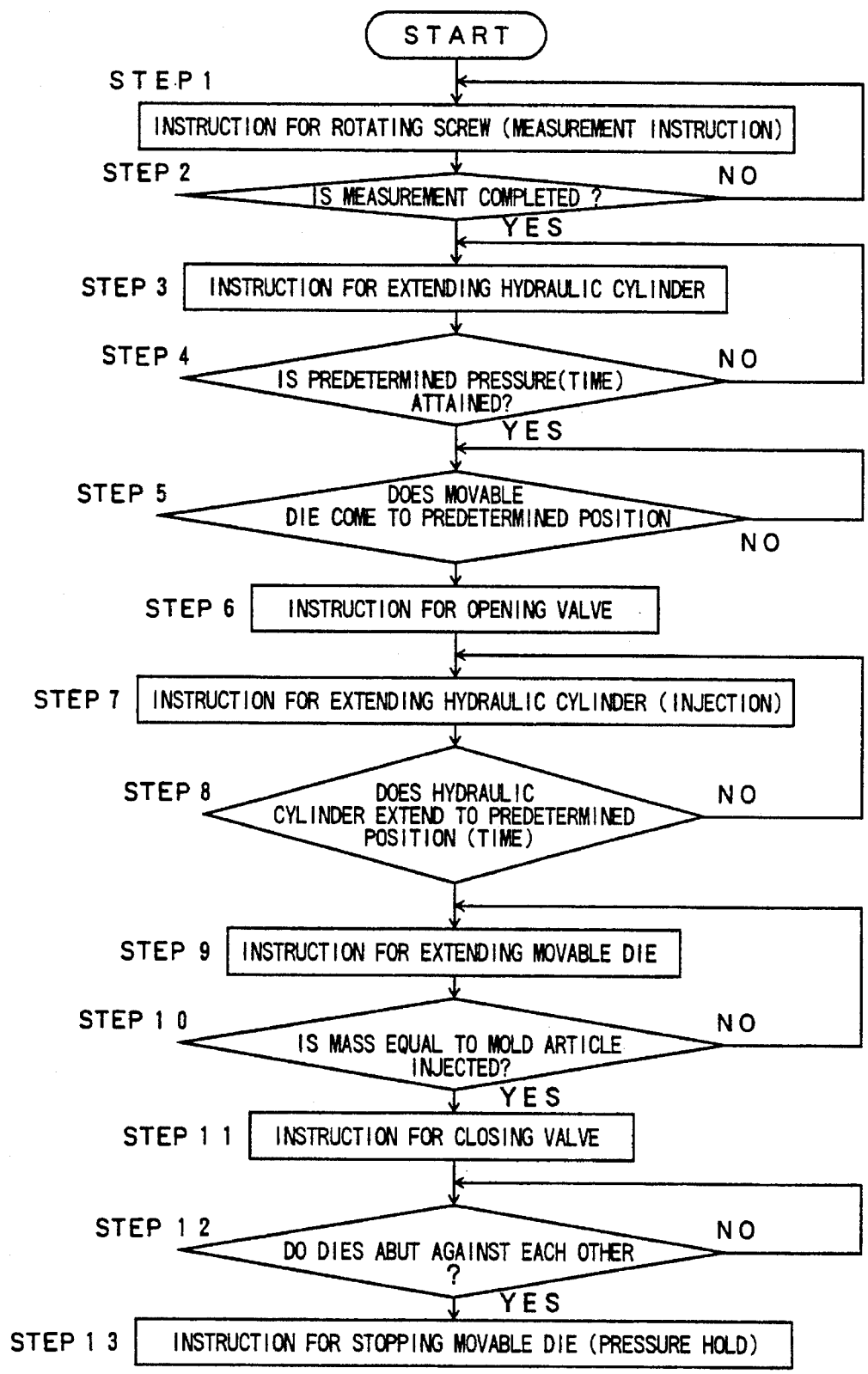
FIG. 14 is a flow chart for explaining an injection and compression molding method in another embodiment of the present invention.

The control device 95, as shown in FIG. 13, is composed of RAM 4a, ROM 4b, CPU 4c and CL (clock) 4d. The control device 4 is connected to the distance sensor 100 between the stationary die 11 and the movable die 21, a solenoid selector valve 50a for changing over hydraulic oil for driving the pistons 53 of the die fastening cylinders 55 in the die fastening devices 50, a solenoid valve 73a for changing over hydraulic oil for driving the pistons of the hydraulic cylinders 73 in the injection cylinder section 70, a distance sensor 75 for measuring a stroke of the hydraulic cylinders 73 for ascertaining the injection quantity of the molten plastic material to be fed, the pressure sensor 77 attached to a hydraulic cylinder 73 for measuring the pressure of the molten plastic material to be injected, the step motor 84 for driving the valve 81 in the flow control valve section 80, a movable die stroke setting means 120 for inputting operational positions and speeds of the die fastening devices 50 and/or a timing of injection of the molten plastic material or the like, and an injection volume setting means 130 for setting an injection volume of the molten plastic material, and controls each of valves 50a and 73a and motor 84 in accordance with predetermined instructions.

Explanation will be made of the operation of the above-mentioned arrangement. In the event of the replacement of the dies 11, 21, the dies 11, 21 are removably attached to the stationary die plate 12 and the movable die plate 22, respectively, and then both dies 11, 21 are caused to approach together by the operation of the die opening and closing hydraulic cylinder 31. The stationary die 11 and the movable die 21 are positioned in close contact with each other, and the distance between the stationary die 11 and the movable die 21, as indicated by means of the distance sensor 100, is set to zero. Then, the outlet of the heating cylinder 71 is made to abut against the resin inlet in the stationary die 11.

Figure 12A:
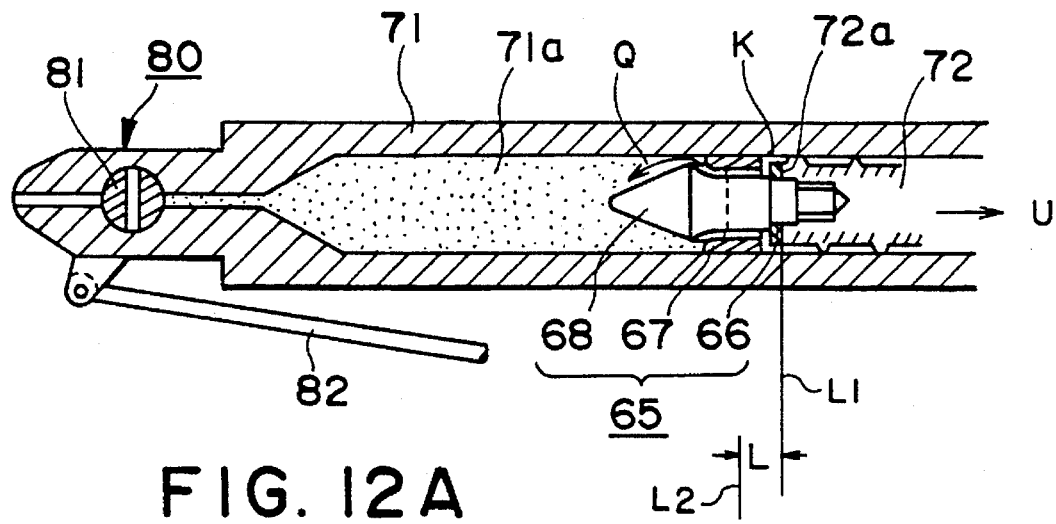
Figure 12B:
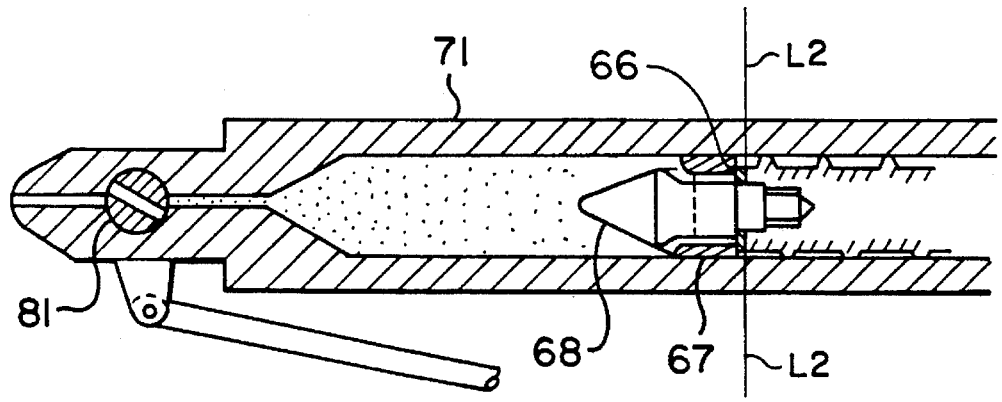
Figure 12C:
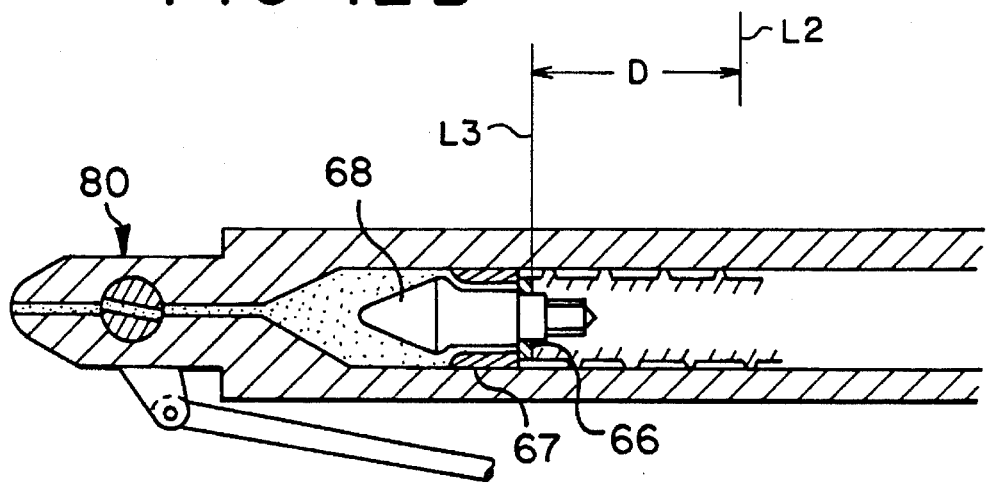

In order to initiate die closing, in step 1 a rotating instruction is delivered to the hydraulic motor 76 so that the screw 72 is rotated while it is being retracted by cylinders 73. At this time, the molten resin is fed to the left (the direction of the arrow Q) through the clearance K. At step 2, a determination is made as to whether or not a predetermined quantity of the resin has been fed into the heating cylinder 71. If it has been fed (as shown in FIG. 12A), at step 3 the screw rotation instruction to motor 76 is terminated, and a screw advance instruction is delivered to the hydraulic cylinders 73. After the advancing of the hydraulic cylinders 73 has been initiated, a determination is made as to whether or not the pressure of the molten resin has reached a predetermined pressure value (which may be lower than the injection pressure), in accordance with a signal from the pressure sensor 77 attached to a hydraulic cylinder 73. If the pressure has not yet reached the predetermined pressure value, the procedure is returned to step 3 so as to repeat the operation. If the predetermined pressure value has been reached, the procedure is advanced to step 5 where a determination is made as to whether or not the movable die 21 has reached a predetermined position, in accordance with a signal from the distance sensor 100. If the movable die 21 has not reached the predetermined position, the step 5 is repeated. If the movable die 21 has reached the predetermined position, the procedure is advanced to step 6, and an operating instruction is delivered from the control device 95 to step motor 84 so as to swing the valve 81 to an at least partially opened position. FIG. 12B shows an intermediate opening position of the valve 81. At this time, the position of the screw 72 is set as an original point (time or distance) so as to measure the injection volume of the molten resin which is then injected into the mold cavity.

When the valve 81 is opened at step 6, an advance instruction is again delivered to the hydraulic cylinders 73 at step 7 so as to initiate the injection of the molten resin. At this time, there is still a clearance between the movable die 21 and the stationary die 11 (a faucet slide clearance Y is determined in accordance with the thickness, the size and the like of the molded article, and is generally in the range of about 2 to about 30 mm). Accordingly, the injection can be made at a relatively low pressure, since the injection is made in such a condition that the mold cavity 90 is set to be larger than the final mold volume and the mold cavity 90 is open to atmospheric pressure.

At step 8, a determination is made as to whether or not the hydraulic cylinders 73 are extended by a predetermined distance, that is, whether or not a predetermined quantity of the molten resin has been injected. If the predetermined quantity of the resin has not been injected, the procedure is returned to step 7 which is therefore repeated. If the predetermined quantity of molten resin has been injected, the procedure is advanced to step 9 where an instruction from the control device 95 is delivered to the solenoid control valve 50a for the die fastening devices 50 so that hydraulic oil is fed to the die fastening cylinders 55 from a pump (not shown), and accordingly, the movable die 21 is moved toward the stationary die 11 by means of the die fastening cylinders 55.

At step 10, a determination is made as to whether or not the quantity of the molten plastic material actually injected corresponds to the desired quantity of plastic material in the article to be molded. If the desired quantity has been injected, in step 11 an instruction is delivered from the control device 95 to the step motor 84 in the flow control section 80 so as to swing the valve 81 to its closed position in order to stop the injection of the molten plastic material. At step 12, after the flow control valve section 80 has been closed, the movable die 21 is moved towards its closed position at a predetermined speed and a predetermined pressure so that the plastic material in the mold cavity 90 is compressed and drawn into every nook and corner of the mold cavity 90 so as to enhance the density of the plastic material.

At step 13, a determination is made as to whether or not the movable die 21 abuts against the stationary die 11. If the two dies abut each other, the pistons 53 of the die fastening cylinders 55 are stopped. This condition is maintained, with a hold pressure being applied to the plastic material, until the plastic material resin in the mold cavity 90 has cooled sufficiently. If the two dies do not abut each other, the procedure is returned to step 12.

Although it has been explained in the above-mentioned embodiment that the pressure is detected at step 4 or step 8 so as to determine whether or not the ring 67 of check valve 65 abuts against the valve seat 66 on the screw 72, or whether or not the predetermined quantity of the molten plastic material has been injected, the determination can be made in accordance on a time basis, taking in consideration the bulk of the heating cylinder, the kind of molten resin, etc.

As mentioned above, the distance L (or time) from the position of the completion of the measurement of the molten plastic material to be fed into the portion of chamber 71a between the check valve 65 and the flow control valve section 80, as shown in FIG. 12A, to the position of the initiation of the measurement of the injection quantity, as shown in FIG. 12B, is equal to the distance by which the screw 72 is advanced, since the molten plastic material leaks through the clearance K toward the screw 72 side until the ring 67 on the check valve abuts against the valve seat 66, and accordingly, the pressure of the resin in the heating cylinder chamber 71a can be soon raised while the leakage is eliminated, whereby the pressure becomes stable. In this condition, by measuring the distance D, shown in FIG. 12C, until the completion of the injection of the molten plastic material, the volume of the injected resin can be precisely measured.

Further, at this time, the movable die 21 is moved towards its closed position at a predetermined speed and a predetermined pressure while the molten plastic material is being injected. Accordingly, during compression and drawing of the plastic material into every nook and corner of the mold cavity 90, the injection of the molten plastic material can be completed before the movable die 21 abuts against the stationary die 11, and further, the heating cylinder 71 is not subjected to a high pressure so that the injection pressure can be made to be uniform, thereby it is possible to enhance the accuracy of the injection volume of the molten resin.

Further, although the injection and compression molding method has been explained in the third embodiment as mentioned above, it goes without saying that this method can be also used in an usual injection molding apparatus.

What is claimed is:

1. A method of controlling the injection volume of molten plastic material in an injection and compression molding apparatus wherein molten plastic material is fed from a heating cylinder through a flow control valve into a mold cavity defined between a stationary die and a movable die, said method comprising the steps of:

provideing a reciprocable feed screw in the heating cylinder, the feed screw incorporating a counterflow preventing valve, retracting the feed screw with the counterflow preventing valve being open so as to feed plastic material through the counterflow preventing valve, then advancing the feed screw while the flow control valve is maintained in its closed position so as to cause the counterflow preventing valve to close and thereby raise the pressure of the molten plastic material in a portion of the heating cylinder between the counterflow preventing valve and the flow control valve to a predetermined pressure, determining whether the movable die is at a predetermined distance from the stationary die, initiating the injection of molten plastic material into the mold cavity by opening the flow control valve after the pressure of the molten plastic material in the portion of the heating cylinder between the counterflow preventing valve and the flow control valve has reached said predetermined pressure and the movable die is at said predetermined distance from the stationary die, setting as an original point of a determination of the injection volume one of (a) a position of the feed screw at the opening of the flow control valve after the pressure of the molten plastic material reaches the predetermined pressure and (b) a time at the opening of the flow control valve after the pressure of the molten plastic material reaches the predetermined pressure, injecting the molten plastic material through the thus opened flow control valve into the mold cavity while there is a clearance between the movable die and the stationary die and the mold cavity is open to atmospheric pressure, determining the injection volume of the molten plastic material fed from the heating cylinder through the flow control valve into the mold cavity which is open to atmospheric pressure by one of (a) ascertaining, as the molten plastic material is being injected into the mold cavity, when a position of the feed screw is at a predetermined distance further advanced from the thus set original point, and (b) ascertaining, as the molten plastic material is being injected into the mold cavity, when the feed screw has been further advanced from the thus set original point for a predetermined time, actuating the flow control valve to its closed position, to terminate the injection of the molten plastic material into the mold cavity, upon the occurrence of one of (i) the position of the feed screw is ascertained to be at a predetermined distance from the thus set original point and (ii) the feed screw has been further advanced from the thus set original point for a predetermined time, and after the flow control valve is closed, moving the movable die toward the stationary die until the movable die abuts against the stationary die to compress the plastic material in the mold cavity at a high pressure, whereby the molten plastic material in the heating cylinder is not exposed to the high pressure of the compressing of the plastic material in the mold cavity.

2. A method in accordance with claim 1, further comprising:

maintaining the flow control valve in its closed position during the step of retracting the feed screw, rotating the feed screw during the step of retracting the feed screw so that plastic material is fed through the counterflow preventing valve into the portion of the heating cylinder between the counterflow preventing valve and the flow control valve, determining whether a predetermined quantity of plastic material has been fed through the counterflow preventing valve into the portion of the heating cylinder between the counterflow preventing valve and the flow control valve during the step of retracting the feed screw, and terminating the rotation of the feed screw when the predetermined quantity of plastic material has been fed through the counterflow preventing valve into the portion of the heating cylinder between the counterflow preventing valve and the flow control valve during the step of retracting the feed screw, and wherein the step of advancing the feed screw is initiated after the predetermined quantity of plastic material has been fed through the counterflow preventing valve into the portion of the heating cylinder between the counterflow preventing valve and the flow control valve during the step of retracting the feed screw.

3. A method in accordance with claim 1, wherein the step of advancing the feed screw while the flow control valve is maintained in its closed position comprises:

ascertaining the pressure of the molten plastic material in the portion of the heating cylinder between the counterflow preventing valve and the flow control valve, and comparing the thus ascertained pressure with said predetermined pressure.

4. A method in accordance with claim 1, wherein the counterflow preventing valve comprises a screw head on the distal end portion of the feed screw, a counterflow preventing ring loosely fitted about the screw head, and a valve seat positioned on the feed screw so as to abut the counterflow preventing ring in the closed position of the counterflow preventing valve and to be separated from the counterflow preventing ring in the open position of the counterflow preventing valve.

5. A method in accordance with claim 1, wherein the step of moving the movable die toward the stationary die comprises:

advancing the movable die to a closed position with the stationary die at a speed and a pressure so that the plastic material in the mold cavity is compressed into every nook and corner of the mold cavity, determining if the movable die abuts the stationary die, stopping the advancing of the movable die when the movable die abuts the stationary die, and wherein the method further comprises:

maintaining the movable die in abutment with the stationary die until the thus injected plastic material in the mold cavity has solidified, and then moving the movable die away from the stationary die and removing the thus molded article from the mold cavity.

6. A method in accordance with claim 1, wherein the step of setting as an original point of the determination of the injection volume comprises setting as an original point of the determination of the injection volume a position of the feed screw at the opening of the flow control valve after the pressure of the molten plastic material reaches the predetermined pressure, and wherein the step of determining the injection volume of the molten plastic material fed from the heating cylinder through the flow control valve into the mold cavity comprises ascertaining as the molten plastic material is being injected into the mold cavity, when a position of the feed screw is at a predetermined distance further advanced from the thus set original point.

7. A method in accordance with claim 6, wherein the step of determining the injection volume of the molten plastic material fed from the heating cylinder through the flow control valve into the mold cavity comprises:

ascertaining the position of the feed screw as the molten plastic material is being injected into the mold cavity, determining the difference between the thus ascertained position of the feed screw and the position of the feed screw at the thus set original point, and comparing the thus determined difference with a predetermined difference, and wherein the step of moving the movable die toward the stationary die comprises:

advancing the movable die toward the stationary die when the thus determined difference equals said predetermined difference.

8. A method in accordance with claim 6, wherein the step of determining the injection volume of the molten plastic material fed from the heating cylinder through the flow control valve into the mold cavity comprises:

ascertaining the position of the feed screw as the molten plastic material is being injected into the mold cavity, determining the difference between the thus ascertained position of the feed screw and the position of the feed screw at the thus set original point, and comparing the thus determined difference with a predetermined difference representative of the desired quantity of plastic material to be molded, and wherein the step of actuating the flow control valve comprises:

actuating the flow control valve to its closed position when the thus determined difference equals the predetermined difference.

9. A method in accordance with claim 6, wherein the step of determining whether the movable die is at a predetermined distance from the stationary die comprises:

ascertaining the distance between the movable die and the stationary die, and comparing the thus ascertained distance between the movable die and the stationary die with a predetermined distance between the movable die and the stationary die, and wherein the step of initiating the injection of molten plastic material comprises:

initiating the injection of molten plastic material into the mold cavity by opening the flow control valve after the pressure of the molten plastic material in the portion of the heating cylinder between the counterflow preventing valve and the flow control valve has reached said predetermined pressure and the thus ascertained distance between the movable die and the stationary die has reached said predetermined distance between the movable die and the stationary die.

10. A method in accordance with claim 9, further comprising:

maintaining the flow control valve in its closed position during the step of retracting the feed screw, rotating the feed screw during the step of retracting the feed screw so that plastic material is fed through the counterflow preventing valve into the portion of the heating cylinder between the counterflow preventing valve and the flow control valve, determining whether a predetermined quantity of plastic material has been fed through the counterflow preventing valve into the portion of the heating cylinder between the counterflow preventing valve and the flow control valve during the step of retracting the feed screw, and terminating the rotation of the feed screw when the predetermined quantity of plastic material has been fed through the counterflow preventing valve into the portion of the heating cylinder between the counterflow preventing valve and the flow control valve during the step of retracting the feed screw, and wherein the step of advancing the feed screw is initiated after the predetermined quantity of plastic material has been fed through the counterflow preventing valve into the portion of the heating cylinder between the counterflow preventing valve and the flow control valve during the step of retracting the feed screw.

11. A method in accordance with claim 10, wherein the step of advancing the feed screw while the flow control valve is maintained in its closed position comprises:

ascertaining the pressure of the molten plastic material in the portion of the heating cylinder between the counterflow preventing valve and the flow control valve, and comparing the thus ascertained pressure with said predetermined pressure.

12. A method in accordance with claim 11, wherein the step of determining the injection volume of the molten plastic material fed from the heating cylinder through the flow control valve into the mold cavity comprises:

ascertaining the position of the feed screw as the molten plastic material is being injected into the mold cavity, determining the difference between the thus ascertained position of the feed screw and the position of the feed screw at the thus set original point, and comparing the thus determined difference with a predetermined difference, and wherein the step of moving the movable die toward the stationary die comprises:

advancing the movable die toward the stationary die when the thus determined difference equals said predetermined difference.

13. A method in accordance with claim 11, wherein the step of determining the injection volume of the molten plastic material fed from the heating cylinder through the flow control valve into the mold cavity comprises:

ascertaining the position of the feed screw as the molten plastic material is being injected into the mold cavity, determining the difference between the thus ascertained position of the feed screw and the position of the feed screw at the thus set original point, and comparing the thus determined difference with a first predetermined difference, wherein the step of moving the rotable die toward the stationary die comprises:

advancing the movable die toward the stationary die when the thus determined difference equals said first predetermined difference, and wherein the step of actuating the flow control valve to its closed position comprises:

comparing the thus determined difference with a second predetermined difference representative of the desired quantity of plastic material to be molded, and actuating the flow control valve to its closed position when the thus determined difference equals the second predetermined difference.

14. A method in accordance with claim 13, wherein the step of moving the movable die toward the stationary die comprises:

advancing the movable die to a closed position with the stationary die at a speed and a pressure so that the plastic material in the mold cavity is compressed into every nook and corner of the mold cavity, determining if the movable die abuts the stationary die, stopping the advancing of the movable die when the movable die abuts the stationary die, and wherein the method further comprises:

maintaining the movable die in abutment with the stationary die until the thus injected plastic material in the mold cavity has solidified, and then moving the movable die away from the stationary die and removing the thus molded article from the mold cavity.

15. A method in accordance with claim 14, wherein the counterflow preventing valve comprises a screw head on the distal end portion of the feed screw, a counterflow preventing ring loosely fitted about the screw head, and a valve seat positioned on the feed screw so as to abut the counterflow preventing ring in the closed position of the counterflow preventing valve and to be separated from the counterflow preventing ring in the open position of the counterflow preventing valve.

16. A method in accordance with claim 1, wherein the step of setting as an original point of the determination of the injection volume comprises setting as an original point of the determination of the injection volume a time at the opening of the flow control valve after the pressure of the molten plastic material reaches the predetermined pressure, and wherein the step of determining the injection volume of the molten plastic material fed from the heating cylinder through the flow control valve into the mold cavity comprises ascertaining, as the molten plastic material is being injected into the mold cavity, when the feed screw has been further advanced from the thus set original point for a predetermined time.

17. A method in accordance with claim 16, wherein the step of determining the injection volume of the molten plastic material fed from the heating cylinder through the flow control valve into the mold cavity comprises:

ascertaining the time as the molten plastic material is being injected into the mold cavity, determining the difference between the thus ascertained time and the time at the thus set original point, and comparing the thus determined difference with a predetermined difference, and wherein the step of moving the movable die toward the stationary die comprises:

advancing the movable die toward the stationary die when the thus determined difference equals said predetermined difference.

18. A method in accordance with claim 16, wherein the step of determining the injection volume of the molten plastic material fed from the heating cylinder through the flow control valve into the mold cavity comprises:

ascertaining the time as the molten plastic material is being injected into the mold cavity, determining the difference between the thus ascertained time and the time at the thus set original point, and comparing the thus determined difference with a predetermined difference representative of the desired quantity of plastic material to be molded, and wherein the step of actuating the flow control valve comprises:

actuating the flow control valve to its closed position when the thus determined difference equals the predetermined difference.

19. A method in accordance with claim 16, wherein the step of determinined whether the movable die is at a predetermined distance from the stationary die comprises:

ascertaining the distance between the movable die and the stationary die, and comparing the thus ascertained distance between the movable die and the stationary die with a predetermined distance between the movable die and the stationary die, and wherein the step of initiating the injection of molten plastic material comprises:

initiating the injection of molten plastic material into the mold cavity by opening the flow control valve after the pressure of the molten plastic material in the portion of the heating cylinder between the counterflow preventing valve and the flow control valve has reached said predetermined pressure and the thus ascertained distance between the movable die and the stationary die has reached said predetermined distance between the movable die and the stationary die.

20. A method in accordance with claim 19, further comprising:

maintaining the flow control valve in its closed position during the step of retracting the feed screw, rotating the feed screw during the step of retracting the feed screw so that plastic material is fed through the counterflow preventing valve into the portion of the heating cylinder between the counterflow preventing valve and the flow control valve, determining whether a predetermined quantity of plastic material has been fed through the counterflow preventing valve into the portion of the heating cylinder between the counterflow preventing valve and the flow control valve during the step of retracting the feed screw, and terminating the rotation of the feed screw when the predetermined quantity of plastic material has been fed through the counterflow preventing valve into the portion of the heating cylinder between the counterflow preventing valve and the flow control valve during the step of retracting the feed screw, and wherein the step of advancing the feed screw is initiated after the predetermined quantity of plastic material has been fed through the counterflow preventing valve into the portion of the heating cylinder between the counterflow preventing valve and the flow control valve during the step of retracting the feed screw.

21. A method in accordance with claim 20, wherein the step of advancing the feed screw while the flow control valve is maintained in its closed position comprises:

ascertaining the pressure of the molten plastic material in the portion of the heating cylinder between the counterflow preventing valve and the flow control valve, and comparing the thus ascertained pressure with said predetermined pressure.

22. A method in accordance with claim 21, wherein the step of determining the injection volume of the molten plastic material fed from the heating cylinder through the flow control valve into the mold cavity comprises:

ascertaining the time as the molten plastic material is being injected into the mold cavity, determining the difference between the thus ascertained time and the time at the thus set original point, and comparing the thus determined difference with a predetermined difference, and wherein the step of moving the movable die toward the stationary die comprises:

advancing the movable die toward the stationary die when the thus determined difference equals said predetermined difference.

23. A method in accordance with claim 21, wherein the step of determining the injection volume of the molten plastic material fed from the heating cylinder through the flow control valve into the mold cavity comprises:

ascertaining the time as the molten plastic material is being injected into the mold cavity, determining the difference between the thus ascertained time and the time at the thus set original point, and comparing the thus determined difference with a first predetermined difference, wherein the step of moving the moveable die toward the stationary die comprises:

advancing the movable die toward the stationary die when the thus determined difference equals said first predetermined difference, and wherein the step of actuating the flow control valve to its closed position comprises:

comparing the thus determined difference with a second predetermined difference representative of the desired quantity of plastic material to be molded, and actuating the flow control valve to its closed position when the thus determined difference equals the second predetermined difference.

24. A method in accordance with claim 23, wherein the step of moving the movable die toward the stationary die comprises:

advancing the movable die to a closed position with the stationary die at a speed and a pressure so that the plastic material in the mold cavity is compressed into every nook and corner of the mold cavity, determining if the movable die abuts the stationary die, stopping the advancing of the movable die when the movable die abuts the stationary die, and wherein the method further comprises:

maintaining the movable die in abutment with the stationary die until the thus injected plastic material in the mold cavity has solidified, and then moving the movable die away from the stationary die and removing the thus molded article from the mold cavity.

25. A method in accordance with claim 24, wherein the counterflow preventing valve comprises a screw head on the distal end portion of the feed screw, a counterflow preventing ring loosely fitted about the screw head, and a valve seat positioned on the feed screw so as to abut the counterflow preventing ring in the closed position of the counterflow preventing valve and to be separated from the counterflow preventing ring in the open position of the counterflow preventing valve.

* * * * *

UNITED STATES PATENT AND TRADEMARK OFFICE
CERTIFICATE OF CORRECTION

PATENT NO. : 5,500,166
DATED : March 19, 1996
INVENTOR(S) : Yosuke SASAKI et al

It is certified that error appears in the above-indentified patent and that said Letters Patent is hereby corrected as shown below:

Column 23, line 4, delete "ascertaining as" and
    insert --ascertaining, as--.

Column 24, line 63, delete "rotable" and insert --movable--.

Column 26, line 16, delete "determinined" and
    insert --determining--.

Signed and Sealed this

Third Day of December, 1996

Attest:

BRUCE LEHMAN

Attesting Officer

Commissioner of Patents and Trademarks